(12) United States Patent
Goto et al.

(10) Patent No.: US 11,221,608 B2
(45) Date of Patent: Jan. 11, 2022

(54) DIAGNOSIS DEVICE, DIAGNOSIS SYSTEM, DIAGNOSIS METHOD, AND COMPUTER-READABLE MEDIUM

(71) Applicants: Ricoh Company, Ltd., Tokyo (JP); FANUC CORPORATION, Yamanashi (JP)

(72) Inventors: Satoru Goto, Kanagawa (JP); Junichi Takami, Kanagawa (JP); Yasunobu Shirata, Tokyo (JP); Tomoki Umezawa, Kanagawa (JP); Yohsuke Muramoto, Kanagawa (JP); Takafumi Horio, Kanagawa (JP); Yu Teshima, Kanagawa (JP)

(73) Assignees: RICOH COMPANY, LTD., Tokyo (JP); FANUC CORPORATION, Yamanashi (JP)

( * ) Notice: Subject to any disclaimer, the term of this patent is extended or adjusted under 35 U.S.C. 154(b) by 291 days.

(21) Appl. No.: 16/493,370

(22) PCT Filed: Mar. 16, 2018

(86) PCT No.: PCT/JP2018/010567
§ 371 (c)(1),
(2) Date: Sep. 12, 2019

(87) PCT Pub. No.: WO2018/169069
PCT Pub. Date: Sep. 20, 2018

(65) Prior Publication Data
US 2020/0133230 A1 Apr. 30, 2020

(51) Int. Cl.
*G05B 19/4065* (2006.01)
*G06N 20/00* (2019.01)
*G06N 5/04* (2006.01)

(52) U.S. Cl.
CPC .......... *G05B 19/4065* (2013.01); *G06N 5/04* (2013.01); *G06N 20/00* (2019.01); *G05B 2219/50308* (2013.01)

(58) Field of Classification Search
CPC ...... G05B 19/4065; G05B 2219/50308; G05B 2219/50276; G05B 23/0221; G06N 20/00; G06N 5/04
See application file for complete search history.

(56) References Cited

U.S. PATENT DOCUMENTS

| | | | | |
|---|---|---|---|---|
| 2007/0112558 A1* | 5/2007 | Kobayashi | ............... | G10H 1/38 704/201 |
| 2012/0078670 A1* | 3/2012 | Yamamura | ......... | G05B 19/4184 705/7.11 |

(Continued)

FOREIGN PATENT DOCUMENTS

| | | | | | |
|---|---|---|---|---|---|
| CN | ON 102317978 A | * | 1/2012 | ............... | G06T 7/20 |
| CN | 109711473 A | * | 5/2019 | ............... | G06K 9/62 |

(Continued)

OTHER PUBLICATIONS

International Search Report and Written Opinion dated Jun. 22, 2018 in PCT/JP2018/010567 filed on Mar. 16, 2018.

*Primary Examiner* — Tung S Lau
(74) *Attorney, Agent, or Firm* — Xsensus LLP

(57) ABSTRACT

A device includes: a first acquiring unit to acquire context information corresponding to running operation among pieces of context information; a second acquiring unit to acquire detection information output from a detecting unit detecting a physical quantity of a target device; an extracting unit to extract, from the detection information, feature information indicating a feature of the detection information in an interval including a specific operation interval of the target device; a selecting unit to select reference feature information used as reference based on the feature informa- (Continued)

tion, and sequentially select pieces of target feature information; a calculating unit to calculate a likelihood of a process interval based on a comparison between the reference feature information and each piece of target feature information; a determining unit to determine whether the target feature information corresponding to the likelihood is included in the process interval based on the likelihood; and an estimating unit to estimate the process interval based on a determination result.

18 Claims, 19 Drawing Sheets

(56) References Cited

U.S. PATENT DOCUMENTS

2018/0356282 A1    12/2018  Fukuda et al.
2019/0179297 A1     6/2019  Kuroda et al.

FOREIGN PATENT DOCUMENTS

| | | | | |
|---|---|---|---|---|
| CN | ON 110414611 A | * | 5/2019 | ............... G06K 9/62 |
| JP | 2009-104273 A | * | 5/2009 | ............... G06N 3/00 |
| JP | 2009-104274 A | * | 5/2009 | ............... G06N 3/00 |
| JP | 4392621 B2 | * | 1/2010 | ............... G06N 3/00 |
| JP | 4433323 B2 | * | 3/2010 | ............... G06N 3/00 |
| JP | 4860444 | | 11/2011 | |
| JP | 2017-120622 | | 7/2017 | |
| KR | 10-1678353 B1 | * | 11/2016 | ............... G01H 3/00 |
| WO | 2018/030422 | | 2/2018 | |

* cited by examiner

[Fig. 1]
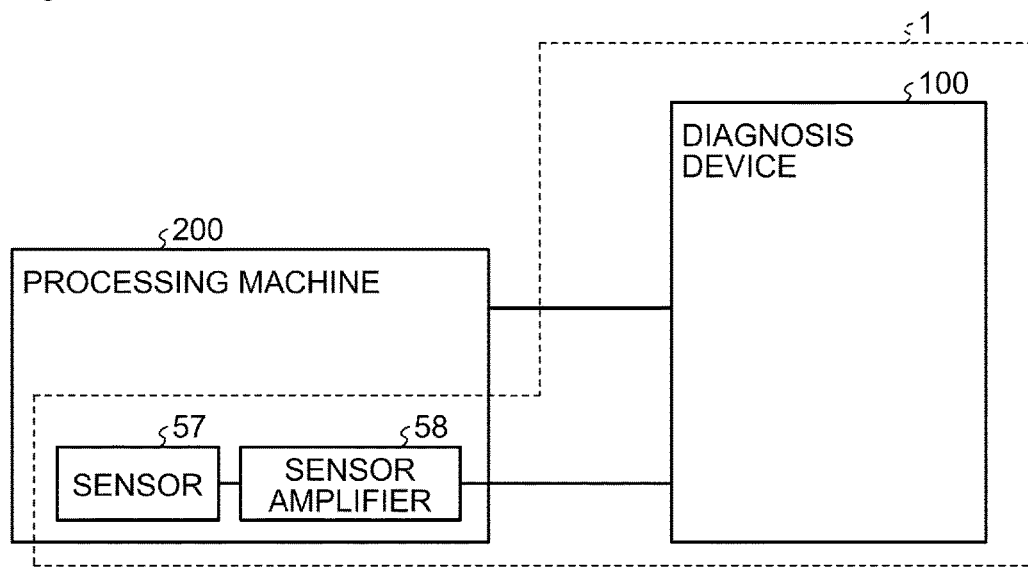
[Fig. 2]
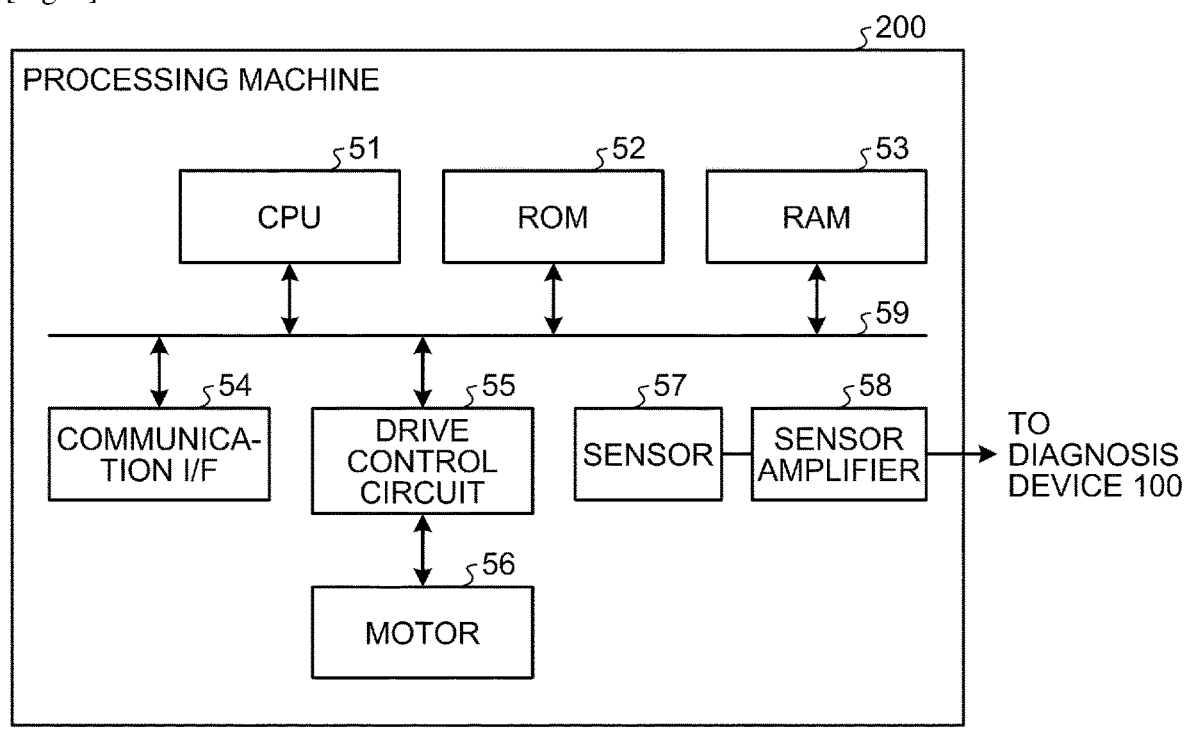

[Fig. 3]
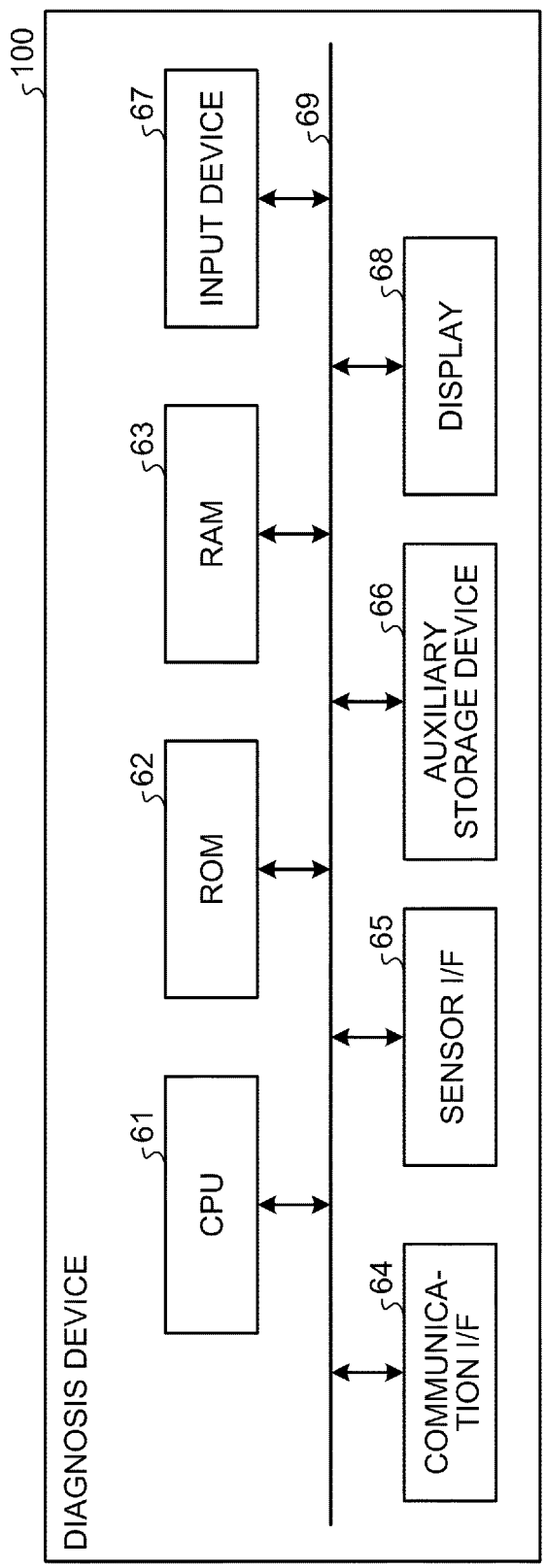

[Fig. 4]
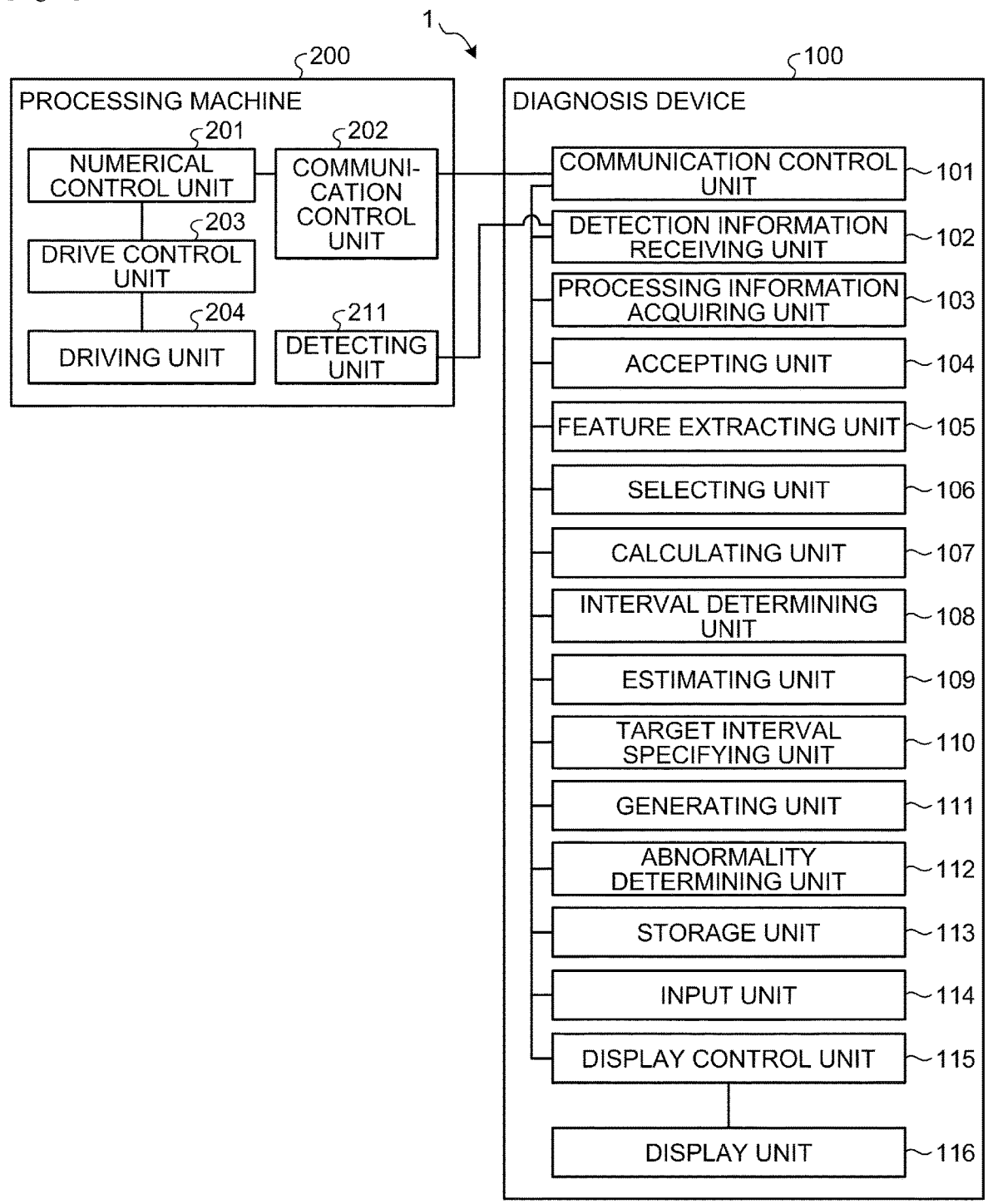

[Fig. 5]
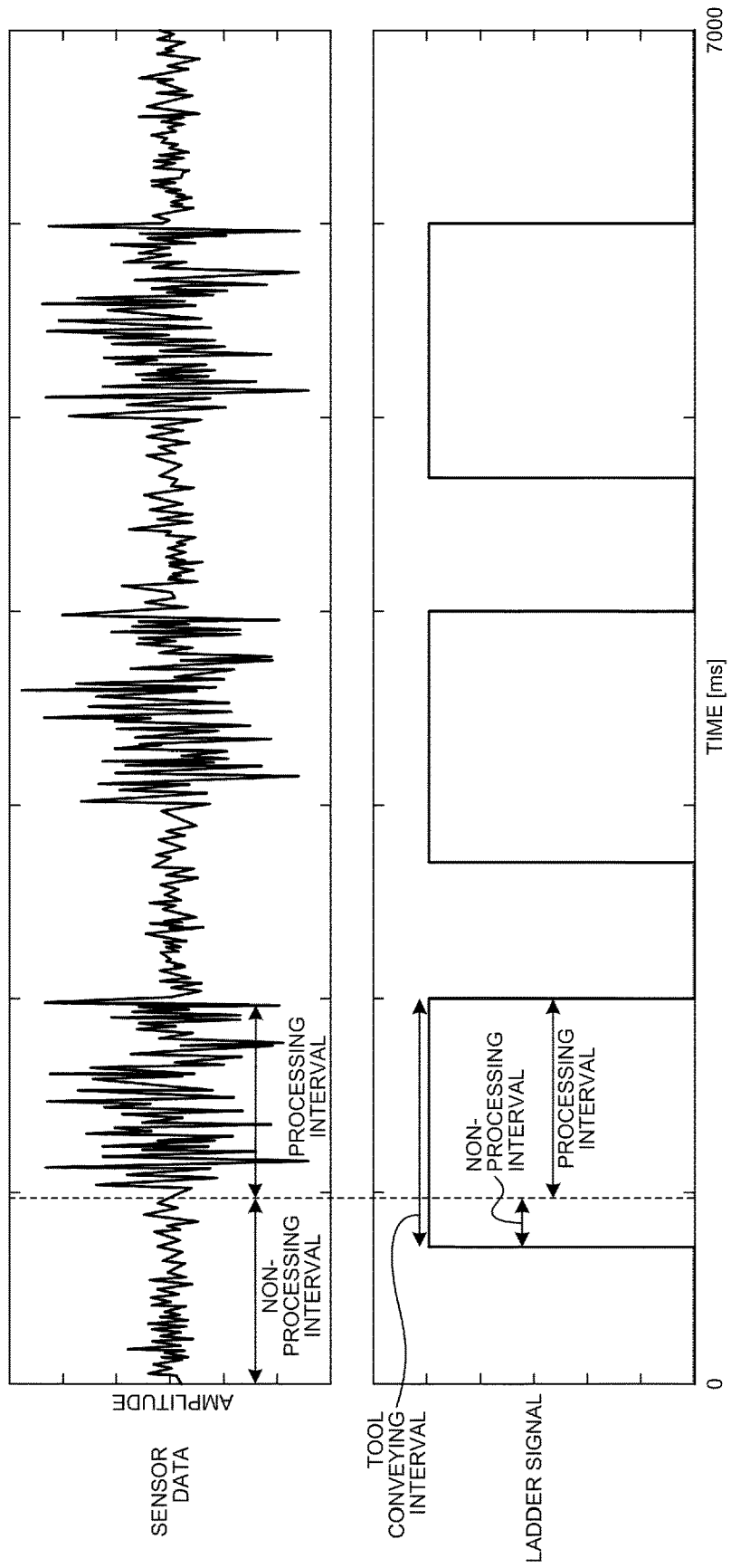

[Fig. 6]
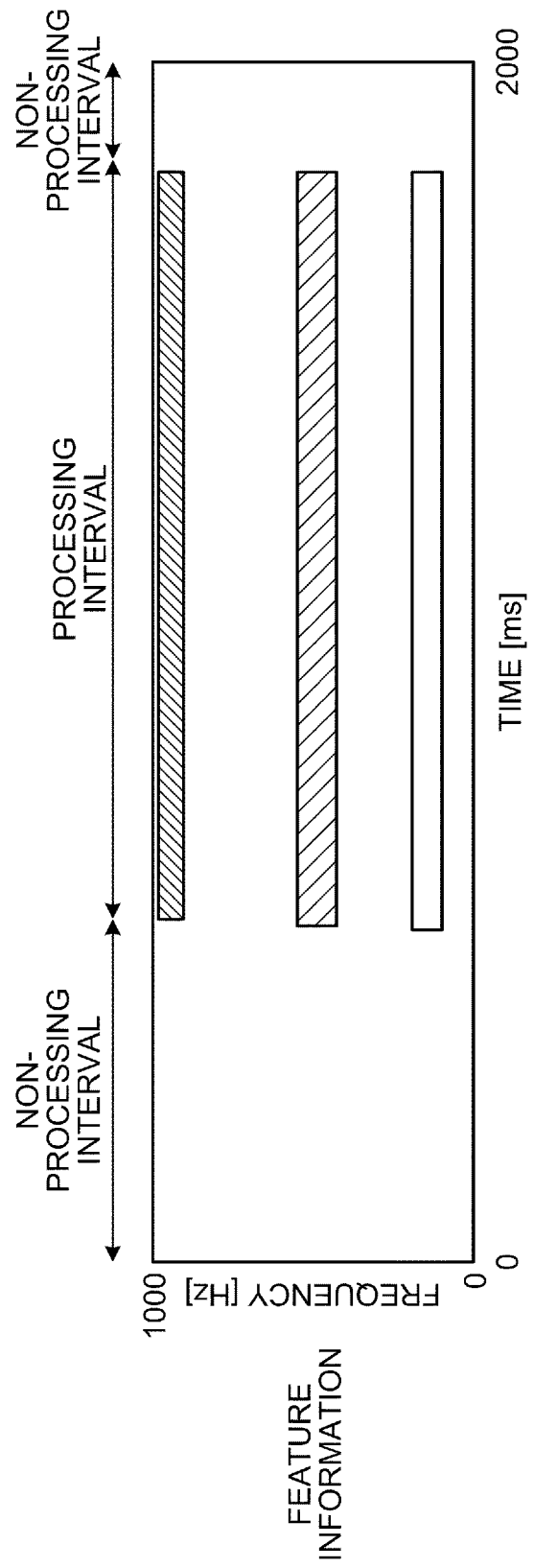

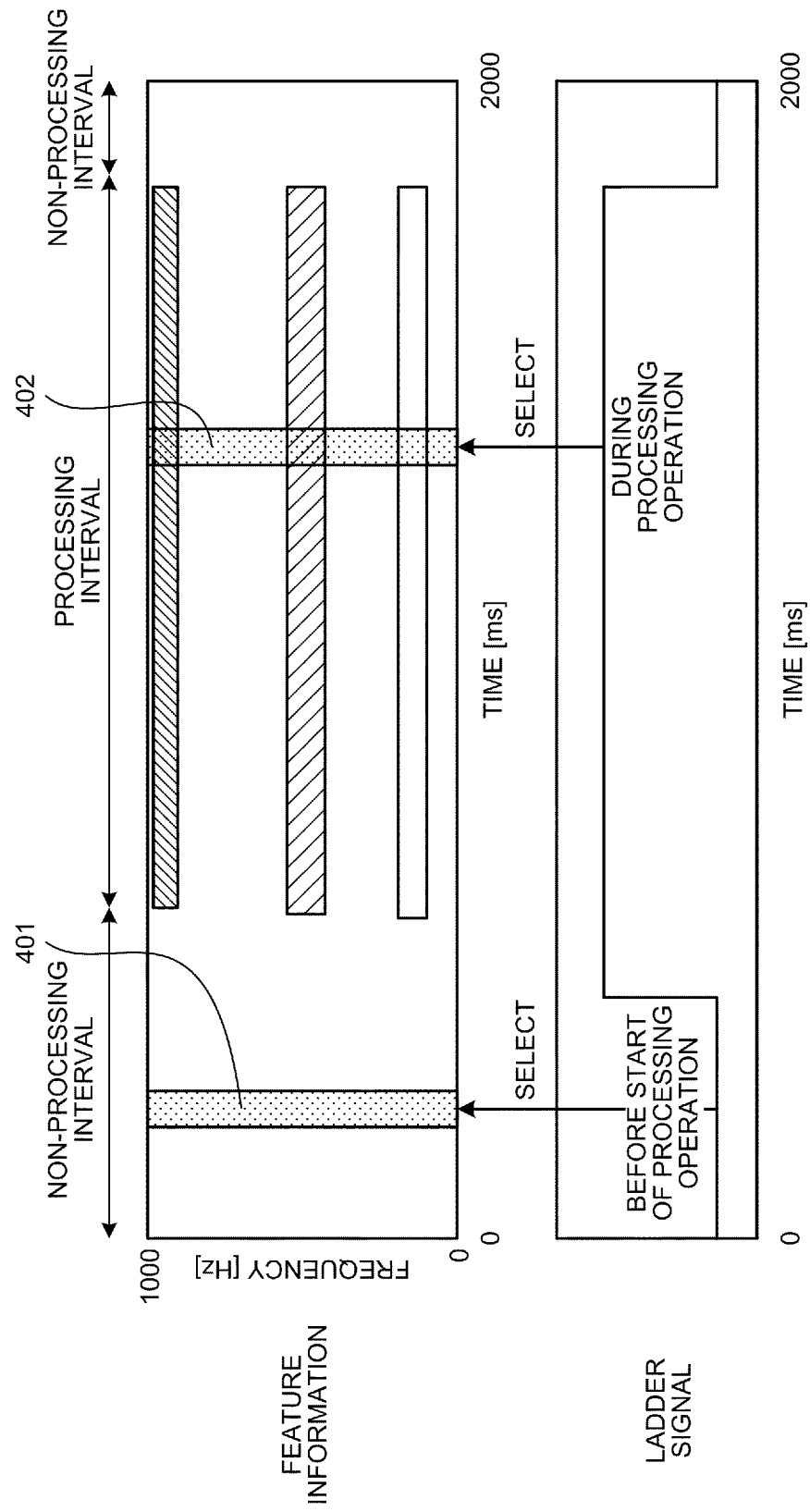

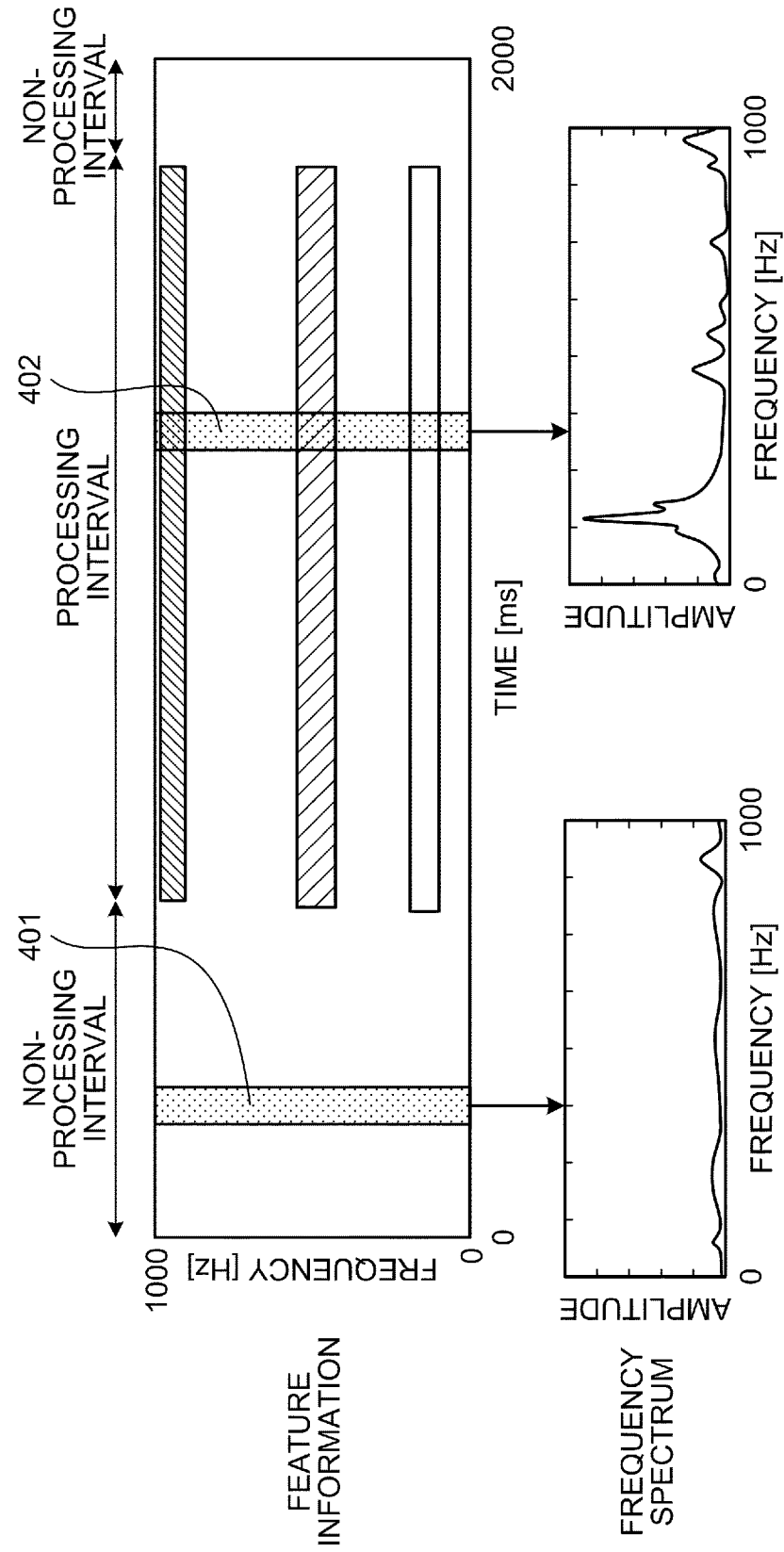
[Fig. 8]

[Fig. 9]
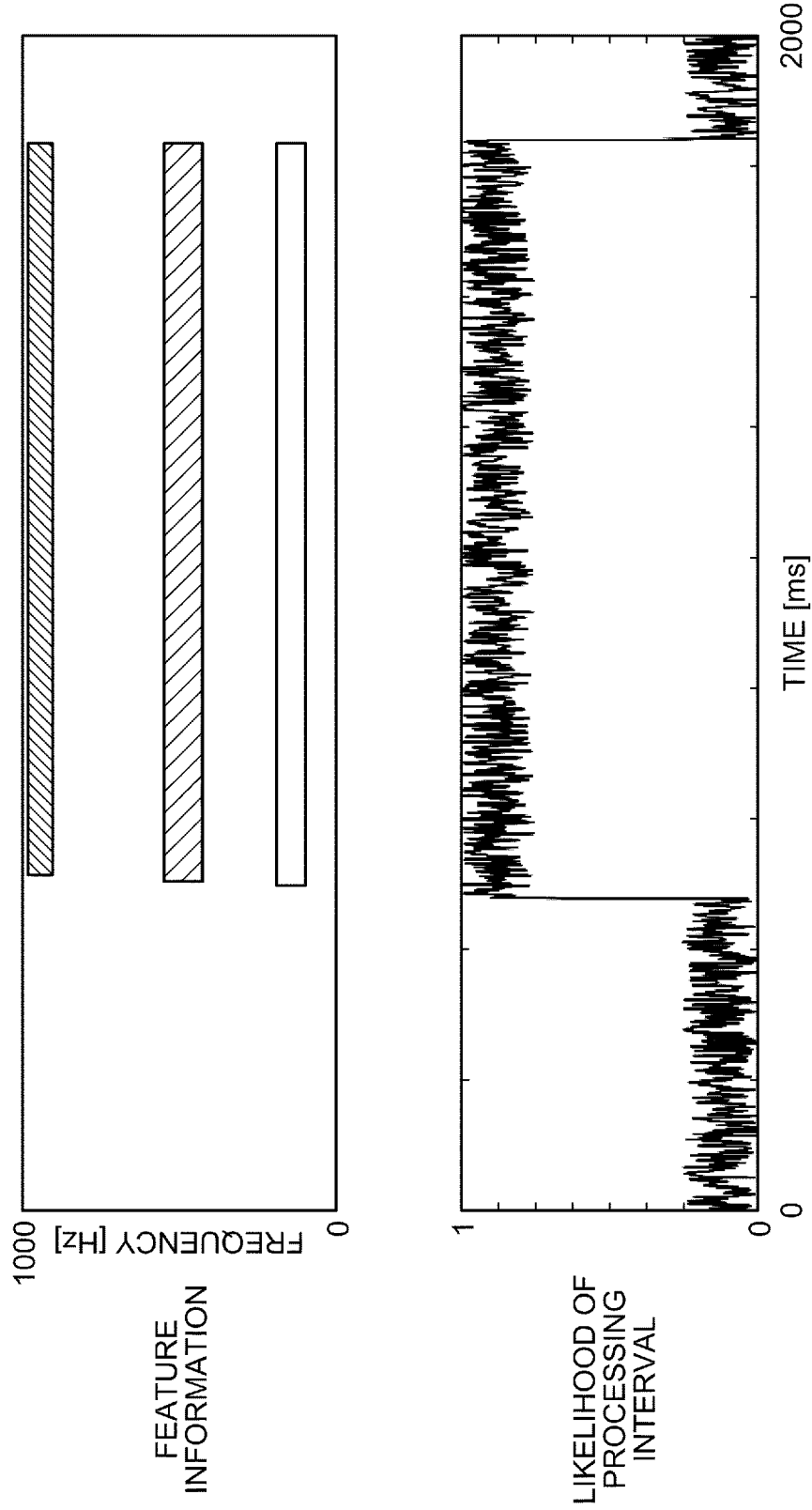

[Fig. 10]
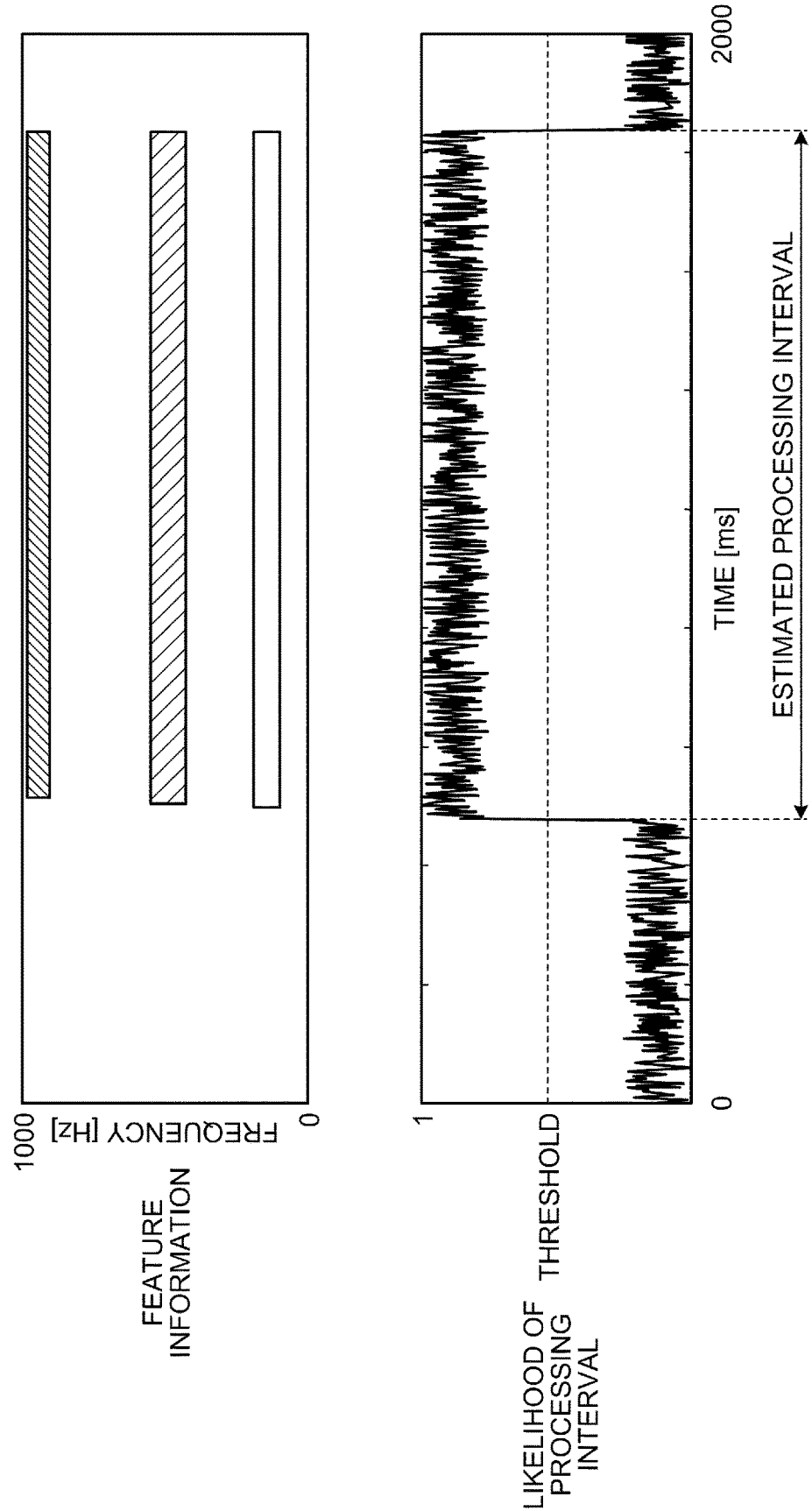

[Fig. 11]
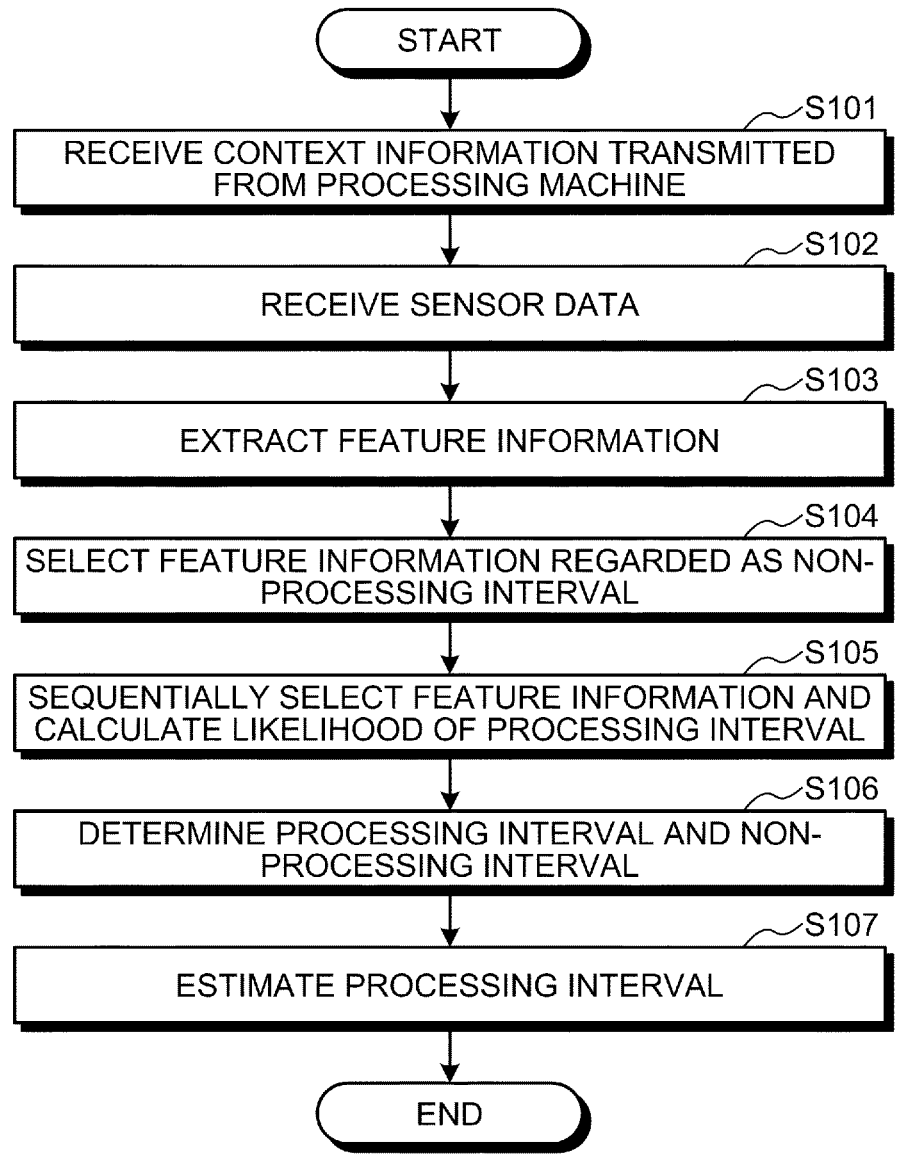

[Fig. 12]
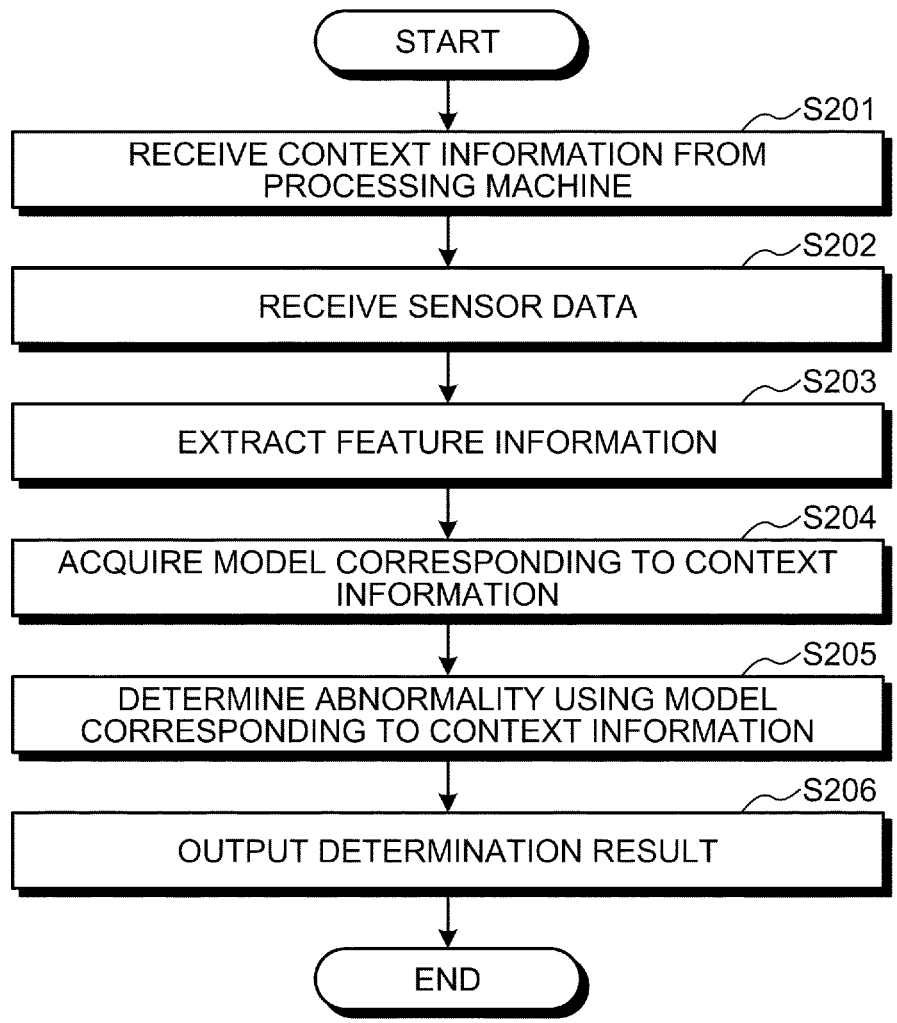

[Fig. 13]
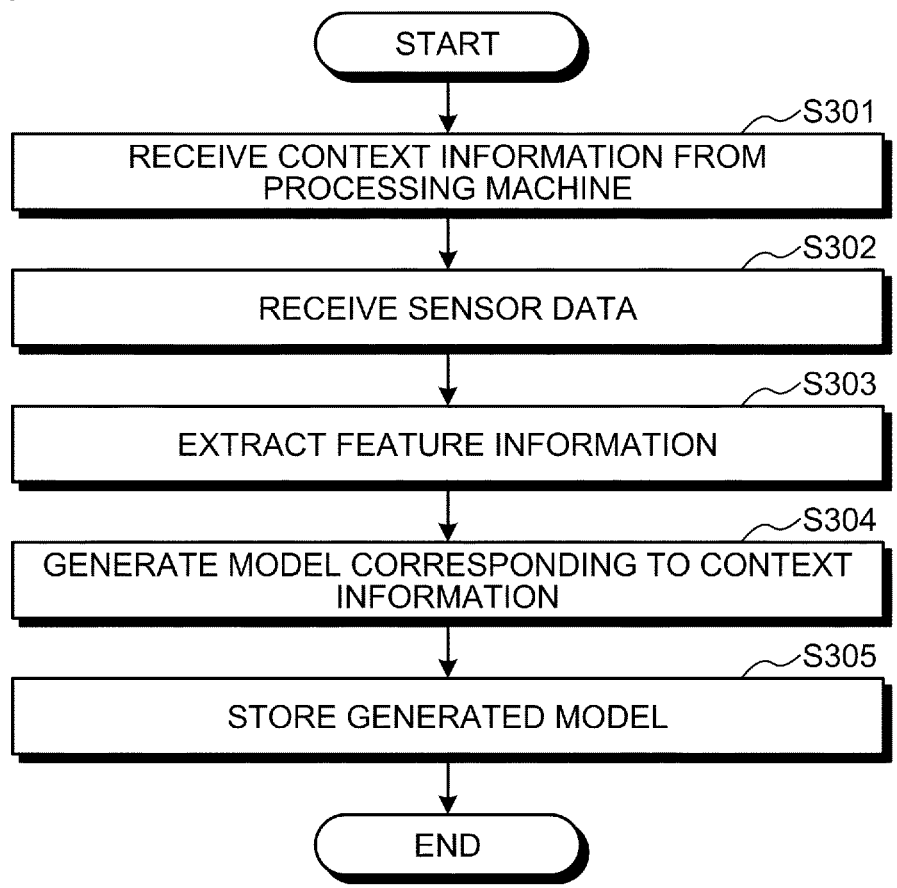

[Fig. 14]
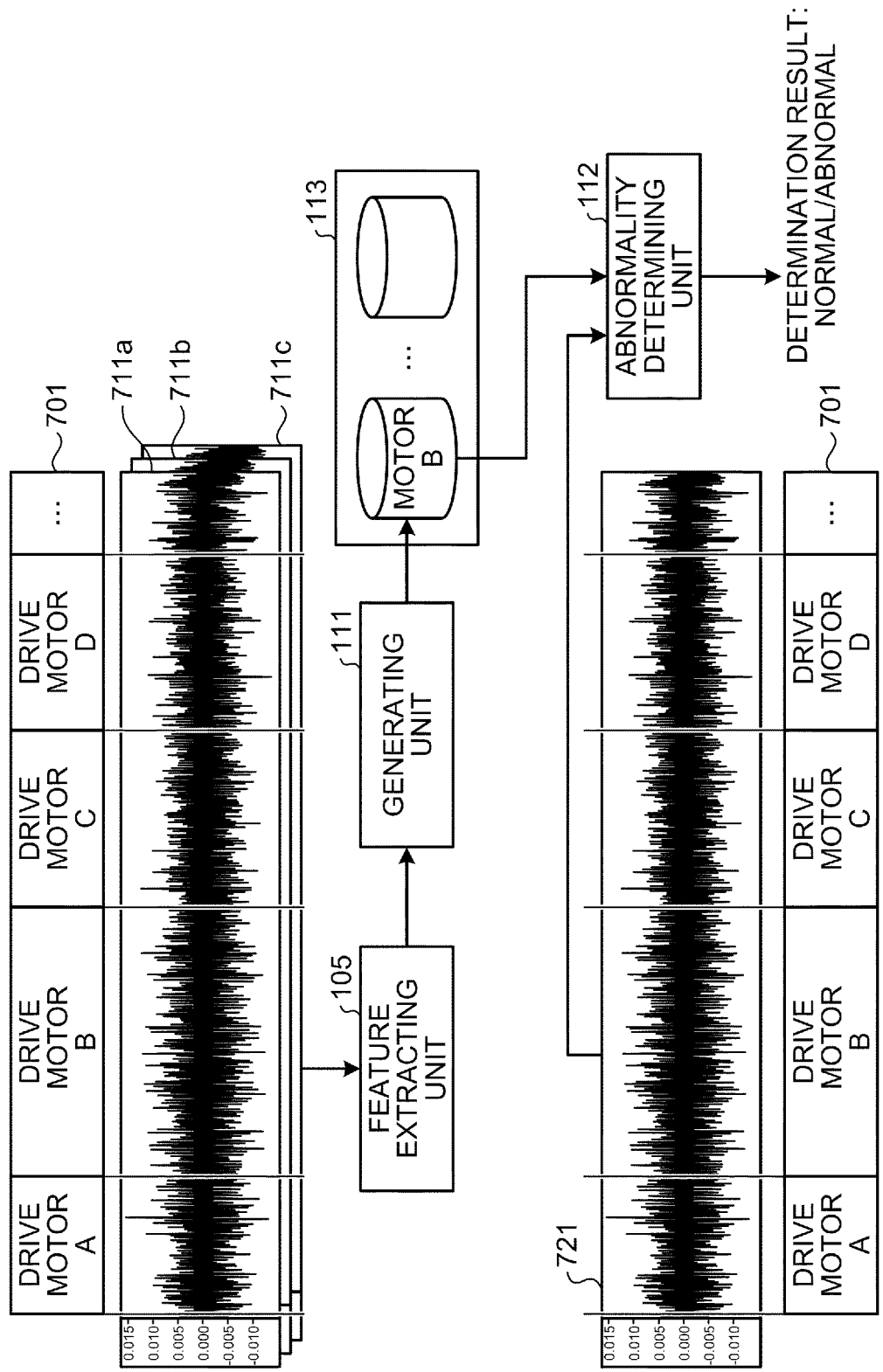

[Fig. 15]
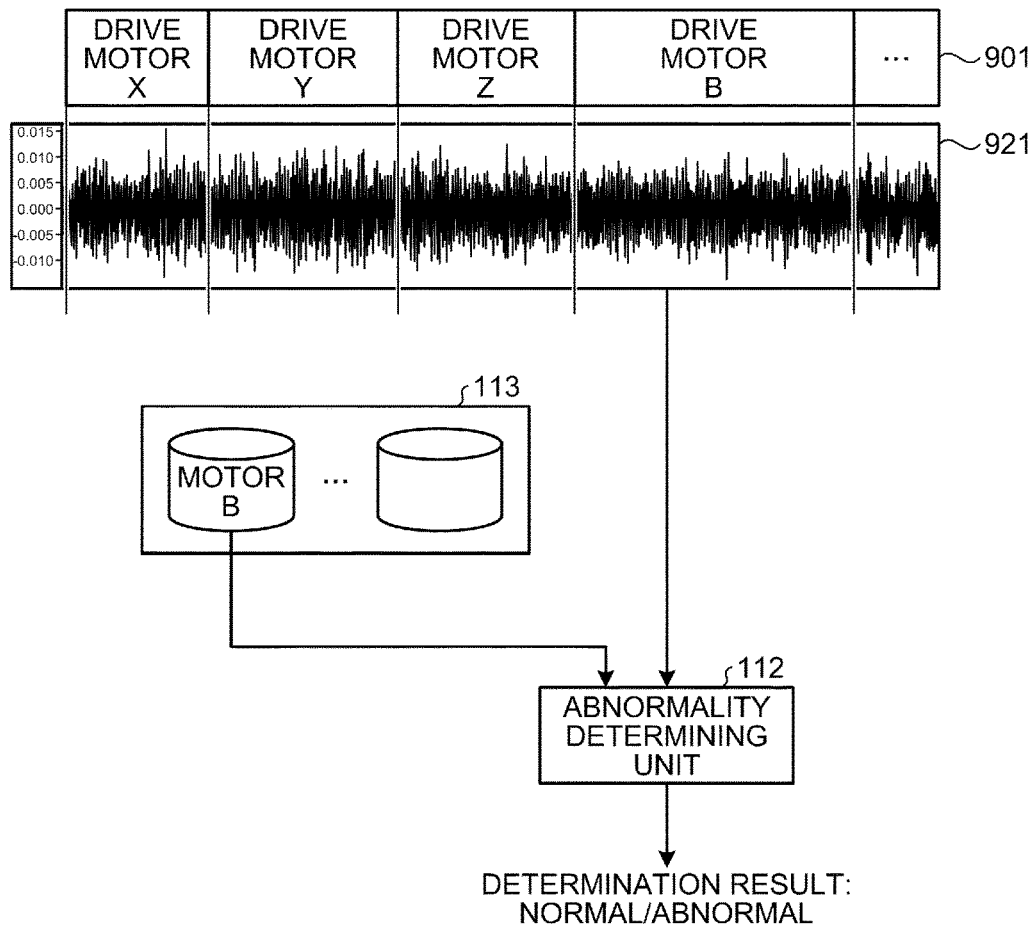
[Fig. 16]
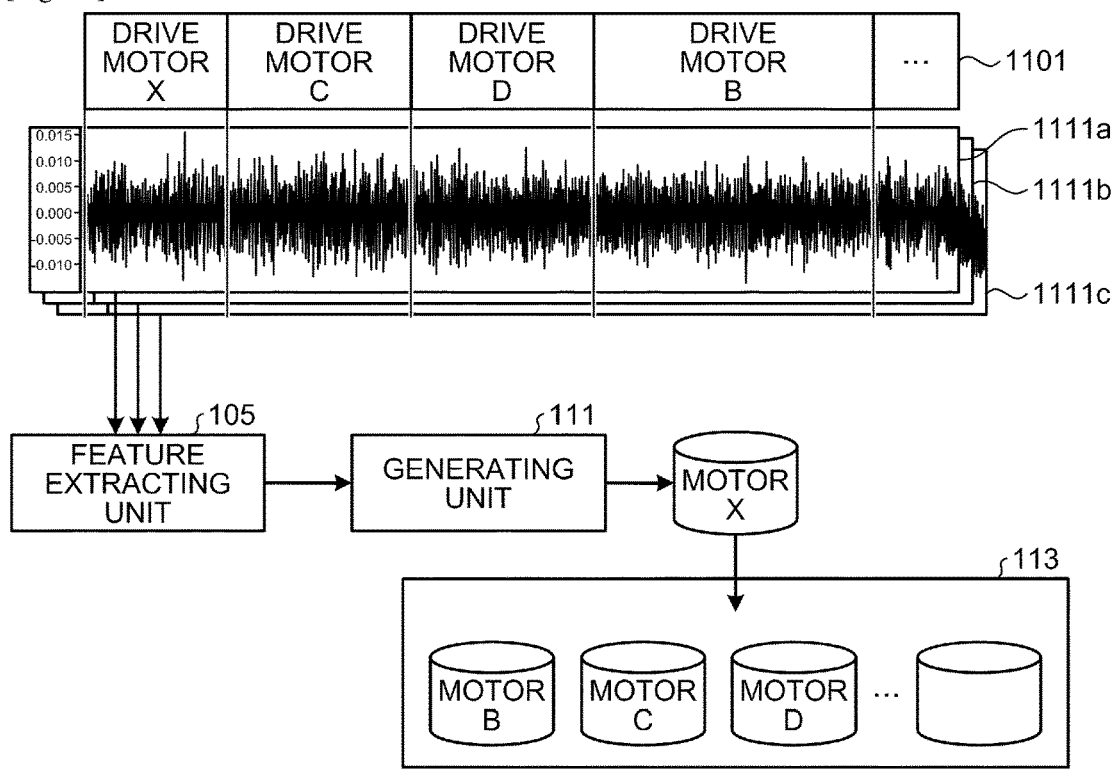

[Fig. 17]
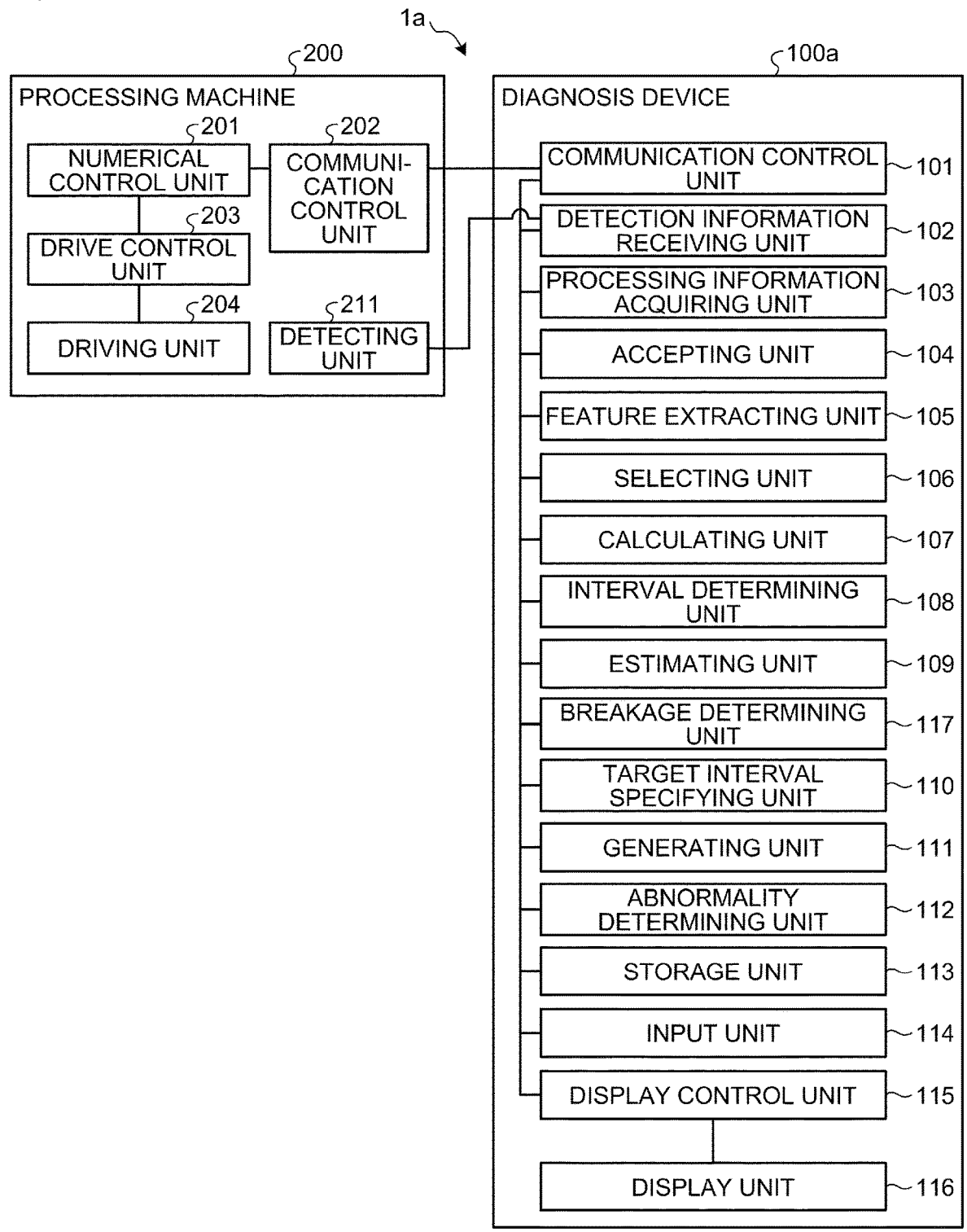

[Fig. 18]
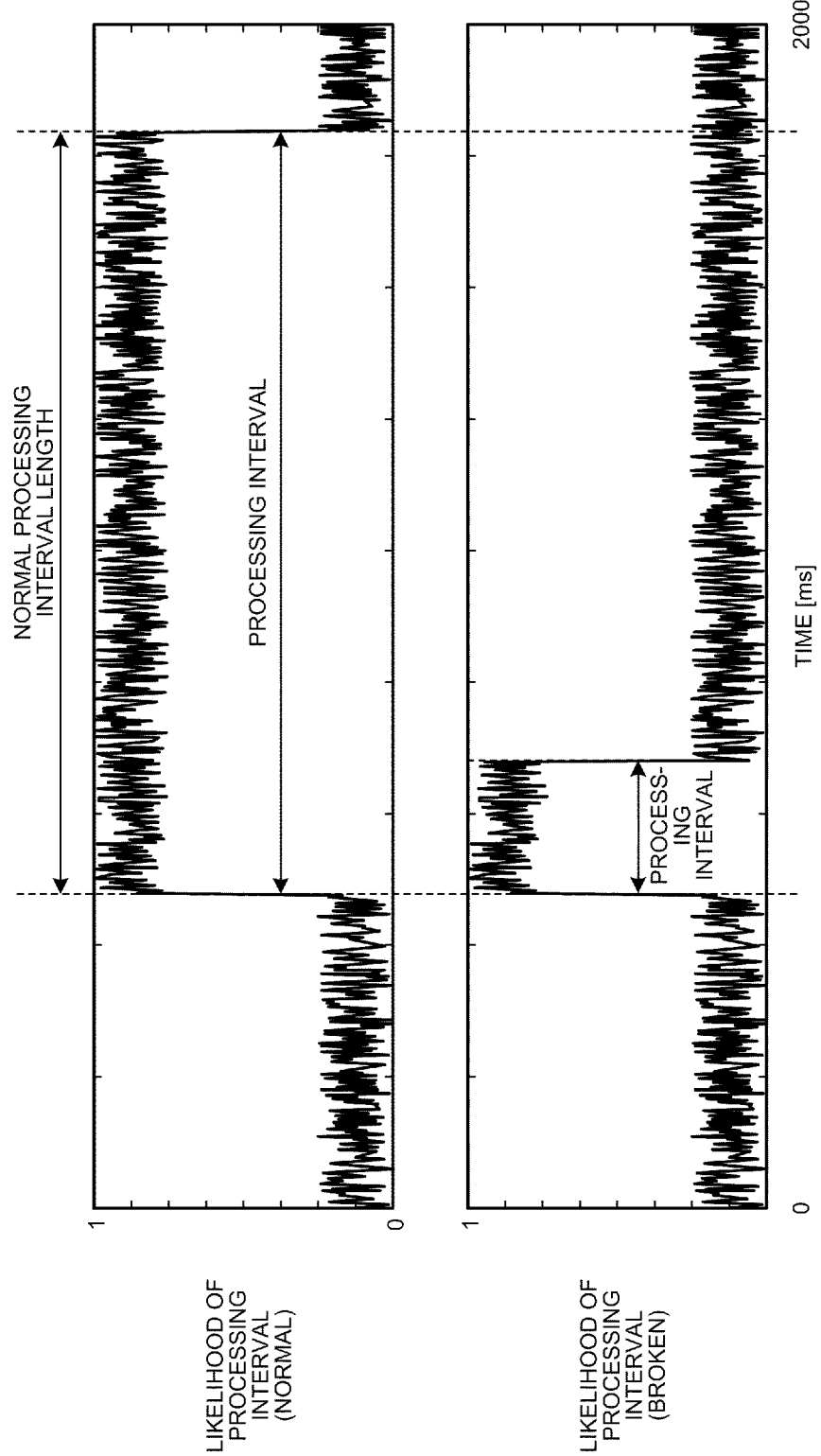

[Fig. 19]
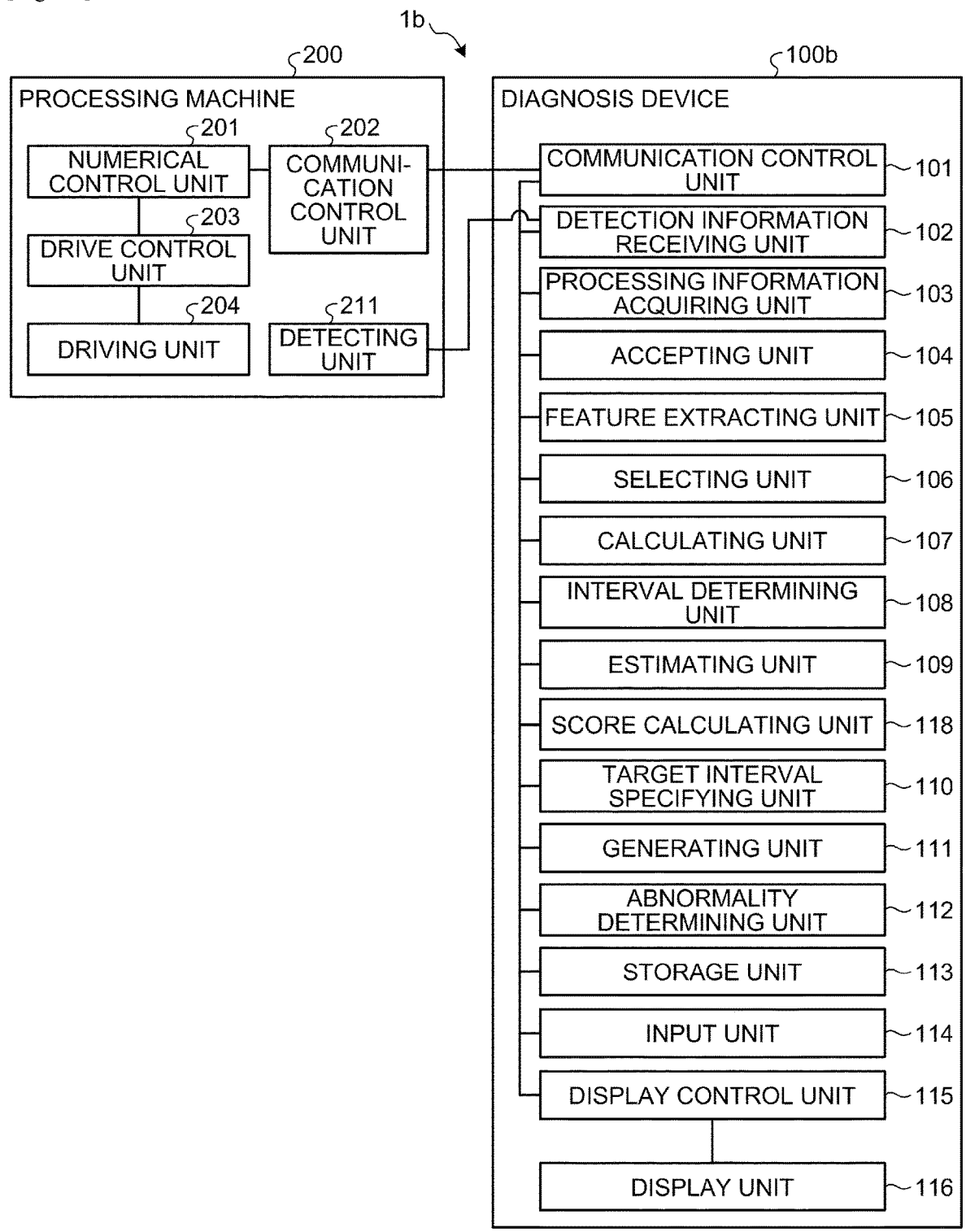

[Fig. 20]
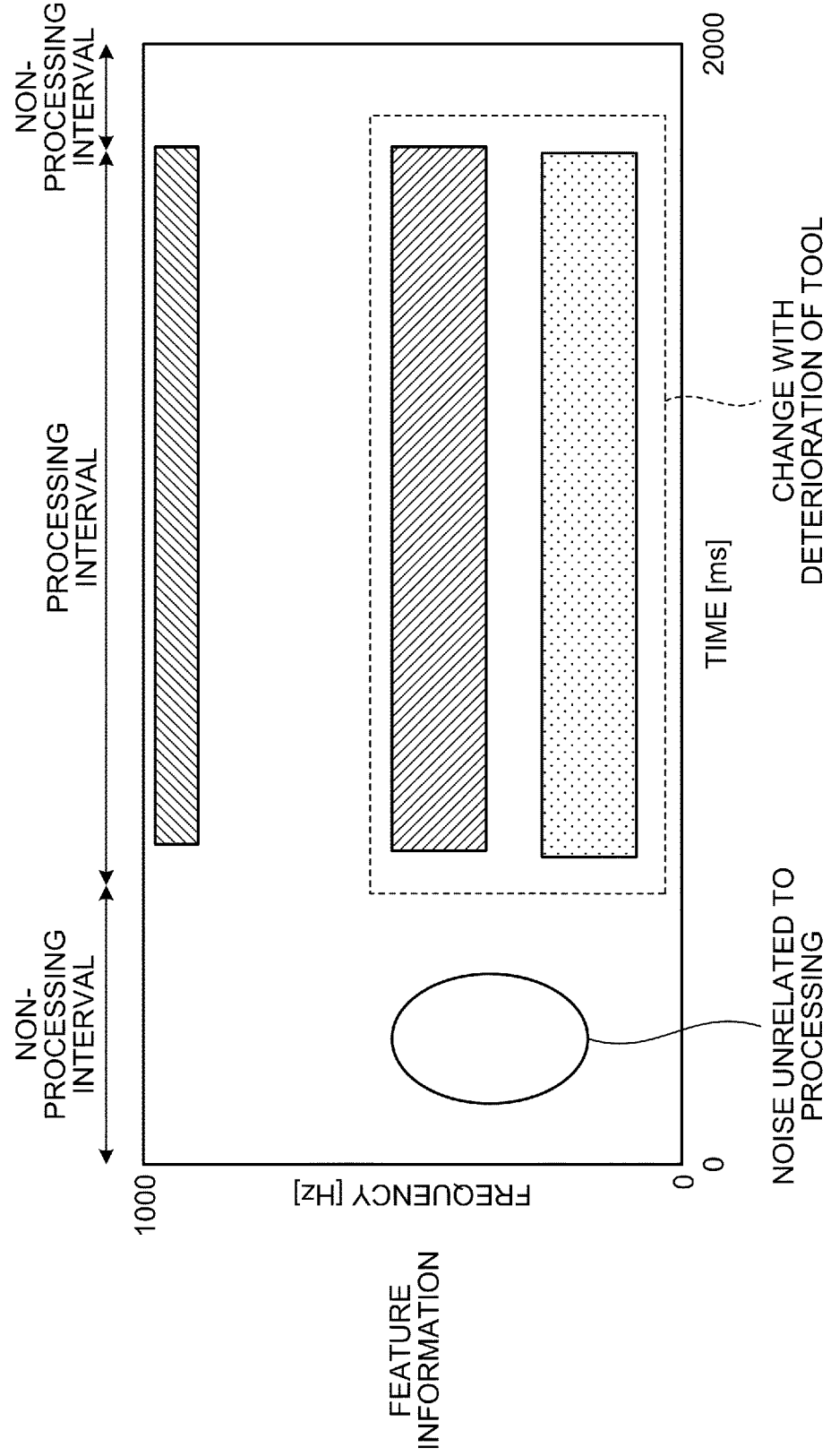

[Fig. 21]
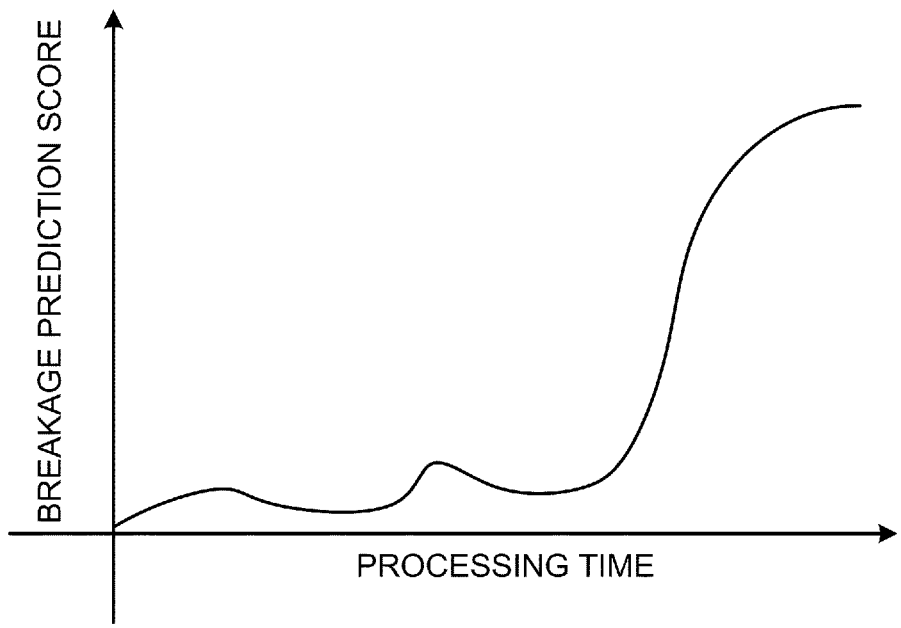

DIAGNOSIS DEVICE, DIAGNOSIS SYSTEM, DIAGNOSIS METHOD, AND COMPUTER-READABLE MEDIUM

TECHNICAL FIELD

The present invention relates to a diagnosis device, a diagnosis system, a diagnosis method, and a computer-readable medium.

BACKGROUND ART

As a method to predict and estimate an abnormality and processing quality of a tool in a case where a machine tool or the like processes a work, there is a known method to detect and use a physical quantity, such as information on a current value, vibrations, or a force, of a motor of the machine tool.

As a device that detects the physical quantity and determines an abnormality of a tool or the like as described above, there is a known device that detects an abnormality in processing operation based on a change in amplitude in vibration information on a vibration sensor (Patent Literature 1).

SUMMARY OF INVENTION

Technical Problem

However, while a system including a vibration sensor to detect vibrations during cutting is adopted in the technology described in Patent Literature 1, it is difficult to clearly recognize an interval in which a cutting process using the tool is actually performed, and in some cases, noise may be mixed in an interval other than the processing interval when the tool is replaced or the position of a work is changed. Further, in a device whose internal state cannot be visibly recognized and including a movable part and an immovable part, abnormal action may be caused by the immovable part. Therefore, in some cases, it is difficult to accurately determine an abnormality of a tool.

The present invention has been conceived in view of the foregoing situations, and an object of the invention is to provide a diagnosis device, a diagnosis system, a diagnosis method, and a computer-readable medium capable of accurately estimating an actual processing interval in detection information that is for determining an abnormality in operation of a target device.

Solution to Problem

According to one aspect of the present invention, a diagnosis device includes a first acquiring unit, a second acquiring unit, an extracting unit, a selecting unit, a first calculating unit, a first determining unit, and an estimating unit. The first acquiring unit is configured to acquire, from a target device, a piece of context information corresponding to running operation of the target device among pieces of context information determined based on different kinds of operations of the target device. The second acquiring unit is configured to acquire detection information output from a detecting unit that detects a physical quantity that changes depending on operation of the target device. The extracting unit configured to extract, from the detection information acquired by the second acquiring unit, feature information indicating a feature of a piece of detection information in an interval that includes a specific operation interval of the target device. The specific operation interval is indicated by the piece of context information. The selecting unit is configured to select a piece of reference feature information used as reference based on the feature information, and sequentially select pieces of target feature information to be compared with the piece of reference feature information. The first calculating unit is configured to calculate a likelihood of a process interval for a specific process of the target device based on a comparison between the piece of reference feature information and each of the pieces of target feature information selected by the selecting unit. The first determining unit is configured to determine whether a piece of target feature information corresponding to the likelihood of the process interval is included in the process interval for the specific process, based on the likelihood of the process interval. The estimating unit is configured to estimate the process interval based on a determination result obtained by the first determining unit.

Advantageous Effects of Invention

According to an embodiment of the present invention, it is possible to accurately estimate an actual processing interval in detection information that is for determining an abnormality in operation of a target device.

BRIEF DESCRIPTION OF DRAWINGS

FIG. 1 is a diagram illustrating an example of an overall configuration of a diagnosis system according to an embodiment.

FIG. 2 is a diagram illustrating an example of a hardware configuration of a processing machine according to the embodiment.

FIG. 3 is a diagram illustrating an example of a hardware configuration of a diagnosis device according to the embodiment.

FIG. 4 is a diagram illustrating an example of a functional block configuration of the diagnosis system according to the embodiment.

FIG. 5 is a diagram illustrating an example of detection information and a ladder signal.

FIG. 6 is a diagram illustrating an example of feature information extracted from the detection information.

FIG. 7 is a diagram for explaining an example of selecting pieces of feature information in a non-processing interval and a processing interval.

FIG. 8 is a diagram illustrating an example of frequency spectrums as the pieces of feature information selected from the non-processing interval and the processing interval.

FIG. 9 is a diagram illustrating an example of calculation of a likelihood of a processing interval.

FIG. 10 is a diagram for explaining operation of estimating a processing interval from the calculated likelihood of a processing interval.

FIG. 11 is a flowchart illustrating an example of a processing interval estimation process in the embodiment.

FIG. 12 is a flowchart illustrating an example of a diagnosis process in the embodiment.

FIG. 13 is a flowchart illustrating an example of a model generation process in the embodiment.

FIG. 14 is a diagram for explaining a concrete example of the model generation process and the diagnosis process in the embodiment.

FIG. 15 is a diagram for explaining an example in which a common model is used in a different processing process.

FIG. 16 is a diagram for explaining operation of generating a model when context information, for which a model has not been generated, is input.

FIG. 17 is a diagram illustrating an example of a functional block configuration of a diagnosis system according to a first modification.

FIG. 18 is a diagram illustrating an example of operation of detecting breakage of a tool.

FIG. 19 is a diagram illustrating an example of a functional block configuration of a diagnosis system according to a second modification.

FIG. 20 is a diagram for explaining an example of a change in a frequency spectrum with deterioration of a tool.

FIG. 21 is a diagram illustrating an example of a breakage prediction score.

DESCRIPTION OF EMBODIMENTS

Embodiments of a diagnosis device, a diagnosis system, a diagnosis method, and a computer-readable medium according to the present invention will be described in detail below with reference to FIG. 1 to FIG. 21. The present invention is not limited by the embodiments below. Components in the embodiments described below include one that can easily be thought of by a person skilled in the art, one that is practically identical, and one that is within an equivalent range. Further, within the scope not departing from the gist of the following embodiments, various omission, replacement, and modifications of the components may be made.

Overall Configuration of Diagnosis System

FIG. 1 is a diagram illustrating an example of an overall configuration of a diagnosis system according to an embodiment. With reference to FIG. 1, an overall configuration of a diagnosis system 1 according to the embodiment will be described.

As illustrated in FIG. 1, the diagnosis system 1 according to the embodiment includes a sensor 57 mounted in a processing machine 200, a sensor amplifier 58 that adjusts detection sensitivity of the sensor 57 or the like, and a diagnosis device 100. Various kinds of filters for filtering an output signal from the sensor 57 or a filter selector to select a filter may be disposed between the sensor amplifier 58 and the diagnosis device 100 as necessary. An amplification factor control unit to control an amplification factor of the sensor amplifier 58 may also be disposed as necessary. The processing machine 200 is communicably connected to the diagnosis device 100. While an example is illustrated in FIG. 1 in which the single processing machine 200 is connected to the diagnosis device 100, the present invention is not limited to this example, but a plurality of the processing machines 200 may be communicably connected to the diagnosis device 100.

The processing machine 200 is a machine tool that performs processing, such as cutting, grinding, or polishing, on a processing target using a tool. The processing machine 200 is an example of a target device to be diagnosed by the diagnosis device 100. The target device is not limited to the processing machine 200, but may be any machine as long as the machine needs estimation in an actual operation interval and can be adopted as a target for diagnosis. For example, a machine, such as an assembly machine, a measuring machine, an inspection machine, or a washing machine, may be adopted as the target device. A machine including a motor or an engine, which serves as a power source and includes clutches and gears, may also be adopted as the target device.

Hereinafter, the processing machine 200 will be described as one example of the target device.

The diagnosis device 100 is a device that is communicably connected to the processing machine 200, and diagnoses an abnormality in operation of the processing machine 200.

The sensor 57 is a sensor that detects a physical quantity, such as vibrations or sounds, which is generated during processing operation by contact between a processing target and a tool, such as a drill, an end mill, a bit tip, or a grinding stone, which is mounted in the processing machine 200, or a physical quantity, such as vibrations or sounds, which is generated by the tool or the processing machine 200 itself, and outputs information on the detected physical quantity as detection information (sensor data) to the diagnosis device 100 via the sensor amplifier 58. The sensor 57 is configured with, for example, a microphone, a vibration sensor, an acceleration sensor, an acoustic emission (AE) sensor, or the like, and detects a change in physical amount such as vibrations or sounds. The sensor 57 is installed near a tool that generates mechanical vibrations, such as a drill, an end mill, a bit tip, or a grinding stone. Installation method of the sensor includes fixing with screws or magnets, and bonding with adhesive. Alternatively, the sensor may be placed in a hole formed in a target machine by drilling The processing machine 200 and the diagnosis device 100 may be connected to each other in any connection configurations. For example, the processing machine 200 and the diagnosis device 100 are connected to each other with a dedicated connecting wire, a wired network such as a wired LAN, a wireless network, or the like.

It may be possible to provide an arbitrary number of the sensors 57. It may be possible to provide a plurality of the sensors 57 that detect the same physical quantity, or a plurality of the sensors 57 that detect different physical quantities.

The sensor amplifier 58 is a device that adjusts detection sensitivity of the sensor 57 or the like, and outputs the detection information detected by the sensor 57.

The sensor 57 and the sensor amplifier 58 may be mounted in the processing machine 200 in advance, or may later be attached to the processing machine 200 that is a complete machine. The sensor amplifier 58 is not necessarily mounted in the processing machine 200, but may be mounted in the diagnosis device 100.

Hardware Configuration of Processing Machine

FIG. 2 is a diagram illustrating an example of a hardware configuration of the processing machine according to the embodiment. A hardware configuration of the processing machine 200 according to the embodiment will be described below with reference to FIG. 2.

As illustrated in FIG. 2, the processing machine 200 includes a central processing unit (CPU) 51, a read only memory (ROM) 52, a random access memory (RAM) 53, a communication interface (I/F) 54, and a drive control circuit 55, all of which are communicably connected to one another via a bus 59. The sensor amplifier 58, to which the sensor 57 is connected, is communicably connected to the diagnosis device 100.

The CPU 51 is an arithmetic device that controls the whole processing machine 200. For example, the CPU 51 executes a program stored in the ROM 52 or the like by using the RAM 53 as a work area (workspace) to control the whole operation of the processing machine 200 and implement a processing function.

The communication I/F 54 is an interface to communicate with an external apparatus, such as the diagnosis device 100. The drive control circuit 55 is a circuit that controls drive of a motor 56. The motor 56 is a motor that drives a tool used for processing. Examples of the tool include a drill, an end mill, a bit tip, a grinding stone, and a table on which a processing target is placed and which is moved in accordance with processing. The sensor 57 and the sensor amplifier 58 are already described above.

Hardware Configuration of Diagnosis Device

FIG. 3 is a diagram illustrating an example of a hardware configuration of the diagnosis device according to the embodiment. A hardware configuration of the diagnosis device 100 according to the embodiment will be described with reference to FIG. 3.

As illustrated in FIG. 3, the diagnosis device 100 includes a CPU 61, a ROM 62, a RAM 63, a communication I/F 64, a sensor I/F 65, an auxiliary storage device 66, an input device 67, and a display 68, all of which are communicably connected to one another via a bus 69.

The CPU 61 is an arithmetic device that controls the whole diagnosis device 100. For example, the CPU 61 executes a program stored in the ROM 62 or the like using the RAM 63 as a work area (workspace) to control the whole operation of the diagnosis device 100 and implement a diagnosis function.

The communication I/F 64 is an interface to communicate with an external apparatus, such as the processing machine 200. The communication I/F 64 is, for example, a network interface card (NIC) compliant with a transmission control protocol/Internet protocol (TCP/IP), or the like.

The sensor I/F 65 is an interface to receive detection information from the sensor 57 via the sensor amplifier 58 mounted in the processing machine 200.

The auxiliary storage device 66 is a non-volatile storage device, such as a hard disk drive (HDD), a solid state drive (SSD), or an electrically erasable programmable read-only memory (EEPROM), to store various kinds of data, such as setting information on the diagnosis device 100, detection information and context information received from the processing machine 200, an operating system (OS), and an application program. While the auxiliary storage device 66 is included in the diagnosis device 100, the present invention is not limited to this example. For example, it may be possible to use a storage device provided outside the diagnosis device 100, or a storage device included in a server device that can perform data communication with the diagnosis device 100.

The input device 67 is an input device, such as a mouse or a keyboard, to perform operation, such as input of characters or numerals, selection of various instructions, and movement of a cursor.

The display 68 is a display device, such as a cathode ray tube (CRT) display, a liquid crystal display (LCD), or an organic electro-luminescence (EL) display, to display characters, numerals, various screens, various operation icons, and the like.

The hardware configuration illustrated in FIG. 3 is one example, and it is not necessary to include all of the constituent elements. Further, it may be possible to include other constituent elements. For example, when the diagnosis device 100 is specialized to perform diagnosis operation on the processing machine 200, and a diagnosis result is transmitted to an external server device or the like, it may be possible to omit the input device 67 and the display 68.

Functional Block Configuration and Operation of Diagnosis System

FIG. 4 is a diagram illustrating an example of a functional block configuration of the diagnosis system according to the embodiment. FIG. 5 is a diagram illustrating an example of detection information and a ladder signal. FIG. 6 is a diagram illustrating an example of feature information extracted from the detection information. FIG. 7 is a diagram for explaining an example of selecting pieces of feature information in a non-processing interval and a processing interval. FIG. 8 is a diagram illustrating an example of frequency spectrums as the pieces of feature information selected from the non-processing interval and the processing interval. FIG. 9 is a diagram illustrating an example of calculation of a likelihood of a processing interval. FIG. 10 is a diagram for explaining operation of estimating a processing interval from the calculated likelihood of a processing interval. With reference to FIG. 4 to FIG. 10, functional block configurations and operation of the diagnosis system 1 and the processing machine 200 according to the embodiment will be described.

As illustrated in FIG. 4, the processing machine 200 includes a numerical control unit 201, a communication control unit 202, a drive control unit 203, a driving unit 204, and a detecting unit 211.

The numerical control unit 201 is a functional unit that performs numerical control (NC) on processing performed by the driving unit 204. For example, the numerical control unit 201 generates and outputs numerical control data to control operation of the driving unit 204. Further, the numerical control unit 201 outputs context information to the communication control unit 202. Here, the context information includes plural pieces of information, which are determined based on different kinds of operations of the processing machine 200. The context information is, for example, identification information on the machine tool (the processing machine 200), identification information on the driving unit 204 (for example, identification information on a tool, or the like), configuration information, such as a diameter and a material, on a tool driven by the driving unit 204, and information that indicates a processing condition, such as an operating state of a tool driven by the driving unit 204, an accumulated use time of the driving unit 204 from a start of use, a load on the driving unit 204, a rotational frequency of the driving unit 204, and a processing speed of the driving unit 204, or the like. For example, an ON/OFF signal (hereinafter, referred to as a "ladder signal") for indicating an interval starting from operation of conveying a tool to a processing target to the end of actual processing process is included as the information indicating an operating state of a tool driven by the driving unit 204 among the pieces of the context information as described above.

For example, the numerical control unit 201 sequentially transmits a piece of context information corresponding to running operation of the processing machine 200 to the diagnosis device 100 via the communication control unit 202. The running operation includes: a state in which the setting information is received immediately before processing; a state during processing including operation; and a state immediately after processing. During processing of a processing target, the numerical control unit 201 changes a type of the driving unit 204 that is driven or a diving state (a rotational frequency, a rotational speed, or the like) of the driving unit 204 depending on a process in the processing. Every time operation is changed to a different kind of operation, the numerical control unit 201 sequentially transmits a piece of context information corresponding to the changed kind of operation to the diagnosis device 100 via the communication control unit 202. The numerical control unit 201 is implemented by, for example, a program executed by the CPU 51 illustrated in FIG. 2.

The communication control unit 202 is a functional unit that controls communication with an external apparatus, such as the diagnosis device 100. For example, the communication control unit 202 transmits a piece of context information corresponding to running operation to the diagnosis device 100. The communication control unit 202 is implemented by, for example, the communication I/F 54 and a program executed by the CPU 51 illustrated in FIG. 2.

The drive control unit 203 is a functional unit that controls drive of the driving unit 204 based on the numerical control data obtained by the numerical control unit 201. The drive control unit 203 is implemented by, for example, the drive control circuit 55 illustrated in FIG. 2.

The driving unit 204 is a functional unit to be subjected to drive control performed by the drive control unit 203. The driving unit 204 drives a tool under the control of the drive control unit 203. The driving unit 204 is an actuator driven by the drive control unit 203, and is implemented by, for example, the motor 56 illustrated in FIG. 2 or the like. The driving unit 204 may be any actuator as long as the actuator can be used for processing and can be subjected to numerical control. It may be possible to provide two or more driving units 204.

The detecting unit 211 is a functional unit that detects a physical quantity, such as vibrations or sounds, which is generated during processing operation by contact between a processing target and a tool, such as a drill, an end mill, a bit tip, or a grinding stone, which is mounted in the processing machine 200, or a physical quantity, such as vibrations or sounds, which is generated by the tool or the processing machine 200 itself, and outputs information on the detected physical quantity as detection information (sensor data) to the diagnosis device 100. The detecting unit 211 is implemented by, for example, the sensor 57 and the sensor amplifier 58 illustrated in FIG. 2. It may be possible to provide an arbitrary number of the detecting units 211. For example, it may be possible to provide a plurality of the detecting units 211 that detect the same physical quantity, or a plurality of the detecting units 211 that detect different physical quantities. For example, if cracking or chipping of a blade that is a tool used for processing has occurred, sounds during the processing change. Therefore, by detecting acoustic data using the detecting unit 211 (microphone) and performing determination using a model for determining normal sounds or the like, it becomes possible to detect an abnormality in operation performed by the processing machine 200.

The numerical control unit 201 and the communication control unit 202 illustrated in FIG. 4 may be implemented by causing the CPU 51 illustrated in FIG. 2 to execute a program, that is, by software, may be implemented by hardware, such as an integrated circuit (IC), or may be implemented by a combination of software and hardware.

As illustrated in FIG. 4, the diagnosis device 100 includes a communication control unit 101, a detection information receiving unit 102 (second acquiring unit), a processing information acquiring unit 103 (first acquiring unit), an accepting unit 104, a feature extracting unit 105 (extracting unit), a selecting unit 106, a calculating unit 107 (first calculating unit), an interval determining unit 108 (first determining unit), an estimating unit 109, a target interval specifying unit 110, a generating unit 111, an abnormality determining unit 112 (third determining unit), a storage unit 113, an input unit 114, a display control unit 115, and a display unit 116.

The communication control unit 101 is a functional unit that controls communication with the processing machine 200. For example, the communication control unit 101 receives the context information from the numerical control unit 201 of the processing machine 200 via the communication control unit 202. The communication control unit 101 is implemented by, for example, the communication I/F 64 and a program executed by the CPU 61 illustrated in FIG. 3.

The detection information receiving unit 102 is a functional unit that receives the detection information from the detecting unit 211 mounted in the processing machine 200. The detection information receiving unit 102 is implemented by, for example, the sensor I/F 65 and a program executed by the CPU 61 illustrated in FIG. 3.

The processing information acquiring unit 103 is a functional unit that acquires, from the processing machine 200, the context information (processing information) received by the communication control unit 101. The processing information acquiring unit 103 is implemented by, for example, a program executed by the CPU 61 illustrated in FIG. 3.

FIG. 5 illustrates an example of the detection information (sensor data) received by the detection information receiving unit 102, and the above-described ladder signal as the context information acquired by the processing information acquiring unit 103. As illustrated in FIG. 5, a detection signal includes waveform parts indicating non-processing intervals (an example of a non-process interval) that occur before and after a tool comes in contact with a processing target, and waveform parts indicating processing intervals (an example of a process interval) in which the tool comes in contact with the processing target and actual processing process is performed. As described above, for example, the processing machine 200 outputs a ladder signal, which is an ON/OFF signal indicating an interval starting from operation of conveying a tool to a processing target to the end of actual processing process, as a part of the context information. Specifically, the processing machine 200 sets the ladder signal to ON when processing operation using a tool is started, performs operation of conveying the tool to a processing target, and sets the ladder signal to OFF when actual processing process is finished, for example. In this case, the processing machine 200 is not configured to set the ladder signal to ON after the tool comes in contact with the processing target; therefore, as illustrated in FIG. 5, an interval in which the ladder signal is in the ON state (hereinafter, may be referred to as a "tool conveying interval") includes a non-processing interval that is an interval in which the tool is not in contact with the processing target (for example, an interval in which operation of conveying the tool to the processing target is performed), and a processing interval in which the tool is in contact with the processing target and processing process is performed. Further, in this case, an interval other than the tool conveying interval (operating interval), that is, an interval in which the ladder signal is in the OFF state, corresponds to the non-processing interval. In this case, it is difficult to accurately determine the processing interval based on the tool conveying interval because a distance between the processing target and the tool may not be obtained depending on a processing condition or the like. Further, if detection information included in the tool conveying interval is used for a process of determining an abnormality in operation performed by the processing machine 200 (diagnosis process), determination accuracy may be reduced because the detection information includes detection information in the non-processing interval. Therefore, as will be described later, it is important to accurately estimate a processing interval from the detection information and use detection information included in the estimated processing interval (and feature information extracted from the detection information, which will be described later) for the diagnosis process in order to perform the diagnosis process with high accuracy.

The accepting unit 104 is a functional unit that accepts input of context information different from the context information that is received by the communication control unit 101 from the processing machine 200. For example, it may be possible to acquire the accumulated use time from the processing machine 200. In this case, the processing machine 200 may include a function to reset (initialize) the accumulated use time when a tool is replaced, for example.

It may be possible to cause the accepting unit 104 to accept the accumulated use time, instead of acquiring the accumulated use time from the processing machine 200. For example, the accepting unit 104 accepts context information input from the input unit 114 that is implemented by a keyboard, a touch panel, or the like. The context information accepted by the accepting unit 104 is not limited to the accumulated use time, but may be information on specifications of a tool to be used (a diameter, the number of blades, or a material of the tool, whether the tool is coated, or the like), or information on a processing target (material, or the like). Further, the accepting unit 104 may be configured to receive the context information from an external apparatus. The accepting unit 104 is implemented by, for example, a program executed by the CPU 61 illustrated in FIG. 3. If it is not necessary to accept the context information from an apparatus other than the processing machine 200, it may be possible to omit the accepting unit 104.

The feature extracting unit 105 is a functional unit that extracts feature information used for determination performed by the abnormality determining unit 112 or the like from the detection information. The feature information may be any kinds of information as long as the information indicates a feature of the detection information. For example, when the detection information is acoustic data collected by a microphone, the feature extracting unit 105 may extract, as the feature information, energy, a frequency spectrum, a Mel frequency cepstral coefficient (MFCC), or the like. The feature extracting unit 105 is implemented by, for example, a program executed by the CPU 61 illustrated in FIG. 3.

FIG. 6 illustrates an example of the feature information that is extracted by the feature extracting unit 105 from the detection information detected by the detection information receiving unit 102. In the present embodiment, it is assumed that the extracted feature information is a frequency spectrum. For example, the feature extracting unit 105 extracts the feature information by performing Fourier transform on the detection information for each frame. Here, the frame indicates a data amount of the detection information in a predetermined time (for example, 20 milliseconds (ms), 40 (ms), or the like), and the feature information corresponds to a data amount of a window length in a case of a frequency spectrum that is obtained by performing Fourier transform on the detection information. The feature information illustrated in FIG. 6 is associated with times of frames of corresponding detection information. As illustrated in FIG. 6, the frequency spectrum in the processing interval has a feature that is different from a frequency spectrum in the non-processing interval. In FIG. 6, frequency components in the non-processing intervals are not illustrated in order to schematically illustrate a difference between the feature information in the non-processing intervals and the feature information in the processing interval, but this does not mean that the frequency components are not present in the non-processing intervals. In the description below, it is assumed that a piece of feature information, which is extracted by the feature extracting unit 105 from a piece of detection information in a predetermined range (for example, an interval including an interval in which the ladder signal is in the ON state) in the detection information received by the detection information receiving unit 102, is used to estimate a single processing interval.

The selecting unit 106 is a functional unit that selects a piece of feature information for each frame from the feature information extracted by the feature extracting unit 105, for example. The selecting unit 106 is implemented by, for example, a program executed by the CPU 61 illustrated in FIG. 3.

FIG. 7 illustrates an example in which the selecting unit 106 selects a piece of feature information corresponding to a frame of a selected part 401 from whole feature information in the non-processing interval, and a piece of feature information corresponding to a frame of a selected part 402 from whole feature information in the processing interval. When a piece of feature information in the non-processing interval is to be selected, it is sufficient to select a piece of feature information in an interval in which the ladder signal is in the OFF state (an interval other than the tool conveying interval), like the selected part 401 as illustrated in FIG. 7. In contrast, when a piece of feature information in the processing interval is to be selected, it is sufficient to select a piece of feature information in, for example, a latter half part of an interval in which the ladder signal is in the ON state like the selected part 402 as illustrated in FIG. 7, because a former half part may include the non-processing interval.

In the following description, the selecting unit 106 selects a piece of feature information in the non-processing interval as reference feature information in order to compare other pieces of feature information selected in other parts (frames) with reference to the piece of feature information in the non-processing interval. The selecting unit 106 sequentially selects pieces of feature information in units of frames in the predetermined range as described above (for example, an interval including an interval in which the ladder signal is in the ON state), in order to perform comparison with the reference feature information. The selecting unit 106 may select, as the reference feature information, information that is generated by performing machine learning or the like on the feature information included in the non-processing interval.

When selecting the reference feature information in the non-processing interval, the selecting unit 106 does not necessarily have to select a piece of feature information in the interval in which the ladder signal is in the OFF state (the interval other than the tool conveying interval) as described above. For example, an interval, which follows immediately after the ladder signal is set to ON, is likely to be the non-processing interval; therefore, it may be possible to select a piece of feature information in this immediately-following interval as the reference feature information. Further, it may be possible to use a rotation frequency of the driving unit 204 rather than the ladder signal, where the rotation frequency is obtained from the context information transmitted by the processing machine 200, and it may be possible to cause the diagnosis device 100 to determine a period, in which the rotation frequency is set for actual processing, and use a determination result. Still further, it may be possible to select a piece of featured information in the non-processing interval by classifying pieces of feature information using a statistical method or a machine learning method.

When the selecting unit 106 sequentially selects pieces of feature information in units of frames in the above-described predetermined range in order to perform comparison with the reference feature information, overlapping of the frames is not prevented from occurring.

With regard to the reference feature information selected by the selecting unit 106, the calculating unit 107, which will be described later, may use information that is obtained by averaging a predetermined number of pieces of reference feature information that have been selected in the past or the like, for example. With this configuration, it is possible to reduce an influence, such as noise, that may be included in the selected reference feature information.

FIG. 8 illustrates an example of a frequency spectrum as a piece of feature information corresponding to a frame of the selected part 401 selected by the selecting unit 106, and a frequency spectrum as a piece of feature information corresponding to a frame of the selected part 402. In FIG. 8, the frequency spectrum of the selected part 402 is a frequency spectrum in the processing interval in which a tool is in contact with a processing target and processing treatment is performed; therefore, a specific frequency component has high amplitude. In contrast, the frequency spectrum of the selected part 401 is a frequency spectrum in the non-processing interval in which the tool is not in contact with the processing target; therefore, vibration amplitude of the detection information is low, and amplitude that appears in the frequency spectrum as the feature information corresponding to the detection information is also low. As described above, the frequency spectrums of the selected parts 401 and 402 illustrated in FIG. 8 are one example; therefore, in some cases, the amplitude that appears in the frequency spectrum of the selected part 401 in the non-processing interval may be higher than that of the selected part 402 in the processing interval, for example.

The calculating unit 107 is a functional unit that compares the reference feature information selected by the selecting unit 106 (the feature information in the non-processing interval) and the pieces of feature information (hereinafter, may be referred to as "target feature information"), which are sequentially selected by the selecting unit 106 from the above-described predetermined range (for example, an interval including an interval in which the ladder signal is in the ON state), and calculates a likelihood of a processing interval (an example of a likelihood of a process interval) for each piece of the target feature information. For example, as a method of comparing the reference feature information and the target feature information, it may be possible to use a method of obtaining the Euclidean distance and performing comparison, or a method using a cross-correlation function, a Gaussian mixture model (GMM), or the like (an example of machine learning). The calculating unit 107 is implemented by, for example, a program executed by the CPU 61 illustrated in FIG. 3.

FIG. 9 illustrates an example in which the calculating unit 107 obtains the Euclidean distance between the reference feature information and each piece of the target feature information, and calculates, as the likelihood of a processing interval, a value by normalizing the Euclidean distances. In FIG. 9, the likelihood of a processing interval is increased as the likelihood of a processing interval approaches "1". The likelihood of a processing interval is calculated from the feature information that is extracted from the detection information including noise; therefore, a value of the likelihood of a processing interval includes fluctuation as illustrated in FIG. 9.

While it is explained that the selecting unit 106 selects a piece of feature information in the non-processing interval as the reference feature information, and the calculating unit 107 compares the reference feature information and each piece of the target feature information to calculate the likelihood of a processing interval, the present invention is not limited to this example. That is, the selecting unit 106 may select a piece of feature information in the processing interval as the reference feature information, and the calculating unit 107 may calculate the likelihood of a processing interval. In this case, it may be possible to calculate a likelihood of a non-processing interval, instead of the likelihood of a processing interval. However, a value indicating the likelihood of a non-processing interval is a value that indicates an unlikelihood of a processing interval.

The interval determining unit 108 is a functional unit that performs threshold determination on the likelihood of a processing interval calculated by the calculating unit 107. The interval determining unit 108 is implemented by, for example, a program executed by the CPU 61 illustrated in FIG. 3.

The estimating unit 109 is a functional unit that estimates, as a processing interval, an interval for which the interval determining unit 108 determines that the likelihood of a processing interval is greater than a predetermined threshold. The estimating unit 109 is implemented by, for example, a program executed by the CPU 61 illustrated in FIG. 3.

FIG. 10 illustrates an example in which the interval determining unit 108 performs the threshold determination and the estimating unit 109 estimates a processing interval with respect to the likelihood of a processing interval calculated by the calculating unit 107. As illustrated in FIG. 10, an "estimated processing interval", in which the likelihood of a processing interval is greater than a predetermined threshold, is estimated as a processing interval. In contrast, it is possible to estimate, as a non-processing interval, an interval in which the likelihood of a processing interval is smaller than the threshold. In this manner, by using, in a diagnosis process, the detection information (feature information) included in the processing interval estimated by the estimating unit 109, it is possible to perform the diagnosis process with high accuracy.

While the interval determining unit 108 performs the threshold determination on the likelihood of a processing interval in order to estimate a processing interval, the present invention is not limited to this example. For example, it may be possible to perform determination on the likelihood of a processing interval using a statistical method.

The target interval specifying unit 110 is a functional unit that specifies a piece of feature information corresponding to the processing interval estimated by the estimating unit 109 in the feature information extracted by the feature extracting unit 105. The target interval specifying unit 110 is implemented by, for example, a program executed by the CPU 61 illustrated in FIG. 3.

The generating unit 111 is a functional unit that generates a model, which is used to determine whether processing is normally performed and which corresponds to the context information acquired by the processing information acquiring unit 103, by performing learning using the feature information that is extracted by the feature extracting unit 105 from the detection information while the processing machine 200 normally operates. If the model is generated by an external apparatus, it is possible to omit the generating unit 111. Further, when context information for which a model is not yet determined and detection information which corresponds to this context information are input, the generating unit 111 may generate a model corresponding to the context information using feature information that is extracted from this detection information. The generating unit 111 is implemented by, for example, a program executed by the CPU 61 illustrated in FIG. 3.

The abnormality determining unit 112 is a functional unit that determines whether operation performed by the processing machine 200 is normal, by using the feature information extracted by the feature extracting unit 105 and the model corresponding to the context information acquired by the processing information acquiring unit 103. The abnormality determining unit 112 calculates a likelihood, which indicates a likelihood that the feature information extracted from the detection information is normal, by using a corresponding model. The abnormality determining unit 112 compares the likelihood and a predetermined threshold, and determines that the operation performed by the processing machine 200 is normal if the likelihood is equal to or greater than the threshold, for example. Further, the abnormality determining unit 112 determines that the operation performed by the processing machine 200 is abnormal if the likelihood is smaller than the threshold. The abnormality determining unit 112 is implemented by, for example, a program executed by the CPU 61 illustrated in FIG. 3.

The storage unit 113 is a functional unit that stores therein the model generated by the generating unit 111, in association with the context information. The storage unit 113 may store therein the detection information received by the detection information receiving unit 102, in association with the context information received by the processing information acquiring unit 103. The storage unit 113 is implemented by, for example, the RAM 63 and the auxiliary storage device 66 illustrated in FIG. 3, or the like.

The input unit 114 is a functional unit to perform operation, such as input of characters, numerals, or the like, selection of various instructions, and movement of a cursor. The input unit 114 is implemented by the input device 67 illustrated in FIG. 3.

The display control unit 115 is a functional unit that controls display operation of the display unit 116. Specifically, the display control unit 115 displays a result of abnormality determination performed by the abnormality determining unit 112, or the like on the display unit 116, for example. The display control unit 115 is implemented by, for example, a program executed by the CPU 61 illustrated in FIG. 3.

The display unit 116 is a functional unit that displays various kinds of information under the control of the display control unit 115. The display unit 116 is implemented by, for example, the display 68 illustrated in FIG. 3.

Each of the functional units (the communication control unit 101, the detection information receiving unit 102, the processing information acquiring unit 103, the accepting unit 104, the feature extracting unit 105, the selecting unit 106, the calculating unit 107, the interval determining unit 108, the estimating unit 109, the target interval specifying unit 110, the generating unit 111, the abnormality determining unit 112, and the display control unit 115) of the diagnosis device 100 illustrated in FIG. 4 may be implemented by causing the CPU 61 illustrated in FIG. 3 to execute a program, that is, by software, may be implemented by hardware, such as an IC, or may be implemented by a combination of software and hardware.

Further, each of the functional units of the diagnosis device 100 and the processing machine 200 illustrated in FIG. 4 are functionally conceptual, and do not necessarily have to be configured in the same manner as described herein. For example, a plurality of the functional units illustrated as independent functional units in FIG. 4 may be configured as a single functional unit. Alternatively, the function of a single functional unit in FIG. 4 may be divided into a plurality of functions and configured as a plurality of functional units.

Processing Interval Estimation Process by Diagnosis Device

FIG. 11 is a flowchart illustrating an example of a processing interval estimation process according to the embodiment. With reference to FIG. 11, the flow of the processing interval estimation process performed by the diagnosis device 100 of the diagnosis system 1 according to the embodiment will be described.

<Step S101>

The numerical control unit 201 of the processing machine 200 sequentially transmits context information (including a ladder signal) indicating running operation of the processing machine 200 to the diagnosis device 100. The communication control unit 101 of the diagnosis device 100 receives the context information transmitted from the processing machine 200 as above. The processing information acquiring unit 103 of the diagnosis device 100 acquires the context information received by the communication control unit 101. Then, the process proceeds to Step S102.

<Step S102>

The detecting unit 211 of the processing machine 200 sequentially outputs detection information. The detection information receiving unit 102 of the diagnosis device 100 receives the detection information (sensor data) transmitted from the processing machine 200 as above. Then, the process proceeds to Step S103.

<Step S103>

The feature extracting unit 105 of the diagnosis device 100 extracts feature information from the received detection information. The feature extracting unit 105 extracts the feature information by performing Fourier transform on the detection information for each frame in a predetermined range (for example, an interval including an interval in which the ladder signal is in the ON state), for example. Then, the process proceeds to Step S104.

<Step S104>

The selecting unit 106 of the diagnosis device 100 selects a piece of feature information for each frame from the feature information extracted by the feature extracting unit 105. Specifically, the selecting unit 106 selects a piece of feature information in a non-processing interval as the reference feature information. Then, the process proceeds to Step S105.

<Step S105>

The selecting unit 106 sequentially selects pieces of feature information (target feature information) in units of frames in the predetermined range (for example, an interval including an interval in which the ladder signal is in the ON state) in order to perform comparison with the reference feature information. The calculating unit 107 of the diagnosis device 100 compares the reference feature information (the piece of feature information in the non-processing interval) selected by the selecting unit 106 and the pieces of target feature information that are sequentially selected by the selecting unit 106 in the above-described predetermined range, and calculates a likelihood of a processing interval for each of the pieces of target feature information. Then, the process proceeds to Step S106.

<Step S106>

The interval determining unit 108 of the diagnosis device 100 performs threshold determination on the likelihood of a processing interval calculated by the calculating unit 107, determines, as a processing interval, an interval for which it is determined that the likelihood of a processing interval is greater than a predetermined threshold, and determines, as a non-processing interval, an interval for which it is determined that the likelihood of a processing interval is smaller than the predetermined threshold. Then, the process proceeds to Step S107.

<Step S107>

The estimating unit 109 of the diagnosis device 100 estimates, as a processing interval, for which the interval determining unit 108 has determined that the likelihood of a processing interval is greater than the predetermined threshold.

Through Step S101 to S107 as described above, the processing interval estimation process is performed.

Diagnosis Process by Diagnosis Device

FIG. 12 is a flowchart illustrating an example of the diagnosis process according to the embodiment. With reference to FIG. 12, the flow of the diagnosis process performed by the diagnosis device 100 of the diagnosis system 1 according to the embodiment will be described.

As described above, the numerical control unit 201 of the processing machine 200 sequentially transmits context information indicating running operation of the processing machine 200 to the diagnosis device 100. The communication control unit 101 of the diagnosis device 100 receives the context information transmitted from the processing machine 200 (Step S201). The processing information acquiring unit 103 of the diagnosis device 100 acquires the context information received by the communication control unit 101.

The detecting unit 211 of the processing machine 200 sequentially outputs detection information. The detection information receiving unit 102 of the diagnosis device 100 receives the detection information (sensor data) transmitted from the processing machine 200 (Step S202).

The feature extracting unit 105 of the diagnosis device 100 extracts feature information from the received detection information (Step S203). In this case, however, it is sufficient that the target interval specifying unit 110 of the diagnosis device 100 specifies a piece of feature information corresponding to the processing interval estimated by the estimating unit 109 in the feature information that is extracted by the feature extracting unit 105 in the processing interval estimation process.

The abnormality determining unit 112 of the diagnosis device 100 acquires, from the storage unit 113, a model corresponding to the context information acquired from the processing information acquiring unit 103 (Step S204).

The abnormality determining unit 112 determines whether the processing machine 200 is normally operating, by using the piece of specified feature information and the acquired model corresponding to the context information (Step S205).

The abnormality determining unit 112 outputs a determination result (Step S206). As a method of outputting the determination result, any method may be adopted. For example, the abnormality determining unit 112 may cause the display control unit 115 of the diagnosis device 100 to display the determination result on the display unit 116. Alternatively, the abnormality determining unit 112 may output the determination result to an external apparatus, such as a server device or a personal computer (PC).

Through Step S201 to S206 as described above, the diagnosis process is performed.

Model Generation Process by Diagnosis Device

FIG. 13 is a flowchart illustrating an example of a model generation process according to the embodiment. With reference to FIG. 13, the flow of the model generation process performed by the diagnosis device 100 of the diagnosis system 1 according to the embodiment will be described. The model generation process is performed in advance of the diagnosis process, for example. Alternatively, the model generation process may be performed when context information for which a model is not yet determined is input.

The communication control unit 101 of the diagnosis device 100 receives context information transmitted from the processing machine 200 (Step S301). The processing information acquiring unit 103 of the diagnosis device 100 acquires the context information received by the communication control unit 101.

The detection information receiving unit 102 of the diagnosis device 100 receives detection information (sensor data) transmitted from the processing machine 200 (Step S302).

The context information and the detection information received as above are used to generate a model. The model is generated for each piece of context information, and therefore, the detection information needs to be associated with corresponding context information. Therefore, for example, the detection information receiving unit 102 stores the received detection information in the storage unit 113 or the like in association with the context information that is received by the communication control unit 101 at the same timing. It may be possible to temporarily store each piece of the information in the storage unit 113 or the like, confirm whether each piece of the information is obtained during normal operation, and use only a piece of information obtained during normal operation to generate a model. That is, it may be possible to generate a model using detection information that is labeled as normal.

Confirmation (labeling) as to whether information is normal may be performed at any timing after the information is stored in the storage unit 113 or the like, or in real time while the processing machine 200 is operating. It may be possible to generate a model without performing labeling, but by assuming that the information is normal. If the information that has been assumed as normal is in reality abnormal, the determination process is not normally performed by use of the generated model. It is possible to determine occurrence of such a situation depending on the frequency that the information is determined as abnormal, or the like, and it is possible to take a countermeasure, such as removal of the erroneously generated model. Further, it may be possible to use a model, which is generated from abnormal information, as a model for determining an abnormality.

The feature extracting unit 105 of the diagnosis device 100 extracts feature information from the detection information received by the detection information receiving unit 102 (Step S303). The feature extracting unit 105 may extract the feature information based on the processing interval that is estimated by the estimating unit 109 in the processing interval estimation process.

The generating unit 111 of the diagnosis device 100 generates a model, which corresponds to the context information acquired by the processing information acquiring unit 103, from the feature information extracted by the feature extracting unit 105 (Step S304). The generating unit 111 associates the generated model with the context information and the feature information, and stores the model in the storage unit 113, for example (Step S305).

Through Step S301 to S305 as described above, the model generation process is performed.

Concrete Example of Model Generation Process and Diagnosis Process

Next, a concrete example of the model generation process and the diagnosis process according to the embodiment will be described. FIG. 14 is a diagram for explaining a concrete example of the model generation process and the diagnosis process in the embodiment.

FIG. 14 illustrates a model generation process and a diagnosis process, as parts of a process of processing a certain component, for example. In the model generation process, a plurality of pieces of detection information (pieces of detection information 711a to 711c in FIG. 14) received together with context information 701 are used. The number of the pieces of detection information is not limited to three, but an arbitrary number of pieces of detection information may be used.

The context information 701 indicates that a processing process includes operation of driving four motors (a motor A, a motor B, a motor C, and a motor D). The feature extracting unit 105 extracts a piece of feature information from a piece of detection information received by the detection information receiving unit 102. The feature extracting unit 105 may extract a piece of feature information based on the processing interval that is estimated by the estimating unit 109 in the processing interval estimation process. The generating unit 111 generates a model using the piece of feature information extracted from the piece of corresponding detection information for each piece of the context information corresponding to each of the motors. The generated model is stored in the storage unit 113 or the like, in association with the piece of corresponding context information. FIG. 14 illustrates an example where a model ("motor B"), which is generated for a piece of context information corresponding to a case of driving the motor B, is stored in the storage unit 113. The stored model is to be referred to in a subsequent diagnosis process. While it is explained that the models are stored in association with only the pieces of context information indicating different kinds of motors, it is of course possible to store models in association with pieces of other context information that are needed, that is, pieces of context information indicating different kinds of tools to be driven by the respective motors, for example.

In the processing interval estimation process and the diagnosis process, detection information 721 is received together with the context information 701, similarly to the model generation process. When the context information indicates that "the motor B is driven", a processing interval is estimated for the received detection information by performing the above-described processing interval estimation process based on a ladder signal included in the context information 701. When the context information indicates that "the motor B is driven", the abnormality determining unit 112 determines whether operation performed by the processing machine 200 is normal by using a piece of detection information in the estimated processing interval in the detection information that is received in a period in which the context information is received, and by using the model "motor B" stored in the storage unit 113, for example.

When different context information is received, the abnormality determining unit 112 similarly performs determination by using a piece of detection information in the estimated processing interval in whole corresponding detection information, and by using a corresponding model.

With this configuration, it is possible to perform the diagnosis process using only the detection information that is valid to determine an abnormality. By eliminating an unnecessary interval from a determination target, it is possible to reduce erroneous detection and reduce calculation costs. That is, it is possible to increase accuracy and efficiency of the diagnosis process.

Further, even in different processing processes, if the same context information indicating the same motor or the like is used for example, it may be possible to perform the diagnosis process by sharing a corresponding model. FIG. 15 is a diagram for explaining an example in which a common model is used in a different processing process.

In FIG. 15, context information 901 indicates that a processing process includes operation of driving four motors (a motor X, a motor Y, a motor Z, and the motor B). For example, operation of using the motor B is common to the processing process illustrated in FIG. 14. Therefore, even in the processing process in FIG. 15, the abnormality determining unit 112 can perform the diagnosis process by using the same model "motor B" stored in the storage unit 113 and a piece of detection information in the estimated processing interval in whole detection information 921.

FIG. 16 is a diagram for explaining operation of generating a model when context information, for which a model is not yet generated, is input. In FIG. 16, context information 1101 indicates that a processing process includes operation of driving four motors (the motor X, the motor C, the motor D, and the motor B). It is assumed that a model is not generated for a piece of context information indicating operation of driving the motor X.

In this case, the feature extracting unit 105 extracts pieces of feature information from pieces of detection information in a period corresponding to the context information indicating that "the motor X is driven", for respective pieces of whole detection information (pieces of detection information 1111a, 1111b, and 1111c in FIG. 16). The generating unit 111 generates a model "motor X" corresponding to the context information indicating that "the motor X is driven" by using pieces of feature information corresponding to the processing interval estimated by the estimating unit 109 in the pieces of extracted feature information, and stores the model in the storage unit 113. With this configuration, it becomes possible to determine an abnormality in subsequent periods in which the motor X is driven.

In this manner, it is possible to receive context information indicating running operation from the processing machine 200, and determine an abnormality using a model corresponding to the received context information. Therefore, it is possible to accurately specify a driving unit that operates, and diagnose an abnormality with high accuracy.

As described above, the diagnosis system 1 according to the embodiment extracts feature information with respect to detection information received from the processing machine 200, calculates a likelihood of a processing interval by comparing reference feature information and pieces of feature information that are present in other parts, and estimates a processing interval based on the likelihood of a processing interval. With this configuration, it is possible to accurately estimate an actual processing interval in detection information that is used for determining an abnormality in operation of a target device, such as the processing machine 200. Accordingly, operation of the target device is diagnosed using feature information in the processing interval estimated as above, so that it is possible to perform the diagnosis process with high accuracy. Further, a model is generated using the feature information in the estimated processing interval, so that it is possible to perform the diagnosis process with high accuracy.

First Modification

In a first modification, explanation will be given of operation of determining whether a tool is broken based on a length of the estimated processing interval. An overall configuration of a diagnosis system according to the first modification and hardware configurations of a diagnosis device (a diagnosis device 100a to be described later) and the processing machine 200 according to the first modification are the same as those of the embodiment described above.

FIG. 17 is a diagram illustrating an example of a functional block configuration of the diagnosis system according to the first modification. FIG. 18 is a diagram illustrating an example of operation of detecting breakage of a tool. With reference to FIG. 17 and FIG. 18, the functional block configuration and the operation of a diagnosis system 1a according to the first modification will be described. The functional block configuration of the processing machine 200 is the same as that of the embodiment described above.

As illustrated in FIG. 17, the diagnosis device 100a of the diagnosis system 1a according to the first modification includes the communication control unit 101, the detection information receiving unit 102 (second acquiring unit), the processing information acquiring unit 103 (first acquiring unit), the accepting unit 104, the feature extracting unit 105 (extracting unit), the selecting unit 106, the calculating unit 107 (first calculating unit), the interval determining unit 108 (first determining unit), the estimating unit 109, the target interval specifying unit 110, the generating unit 111, the abnormality determining unit 112 (third determining unit), the storage unit 113, the input unit 114, the display control unit 115, the display unit 116, and a breakage determining unit 117 (second determining unit). Among the functional units included in the diagnosis device 100a, operation of the functional units other than the breakage determining unit 117 is the same as the operation of the embodiment described above.

The breakage determining unit 117 is a functional unit that determines whether a tool has been broken by comparing a length of a normal processing interval (hereinafter, referred to as a "normal processing interval length"), which has been obtained in advance in association with context information and the processing interval estimated by the estimating unit 109. If a tool is broken during processing operation using the tool, the tool does not come in contact with a processing target in a subsequent processing process; therefore, it is expected that a length of a processing interval estimated by the estimating unit 109 based on the detection information in this case becomes shorter than the normal processing interval length as illustrated in FIG. 18. In this case, the breakage determining unit 117 may determine that the tool has been broken when the length of the processing interval estimated by the estimating unit 109 is a predetermined length shorter than the normal processing interval length, for example. When determining that the tool has been broken, the breakage determining unit 117 may cause the display control unit 115 of the diagnosis device 100a to display a determination result on the display unit 116, or may output the determination result to an external apparatus, such as a server device or a PC, for example. The breakage determining unit 117 is implemented by, for example, a program executed by the CPU 61 illustrated in FIG. 3. The breakage determining unit 117 of the diagnosis device 100a illustrated in FIG. 17 may be implemented by causing the CPU 61 illustrated in FIG. 3 to execute a program, that is, by software, may be implemented by hardware, such as an IC, or may be implemented by a combination of software and hardware.

The normal processing interval length (an example of a length of a predetermined interval) may be an average value of lengths of normal processing intervals that have been estimated in the past, or may be a length of a processing interval that was previously estimated by the estimating unit 109, for example.

While it is explained that the breakage determining unit 117 compares the normal processing interval length and the length of the processing interval estimated by the estimating unit 109, the present invention is not limited to this example. For example, it may be possible to determine whether a tool is broken by comparing the tool conveying interval (an example of a predetermined interval) including both of the processing interval and the non-processing interval as described above and the length of the processing interval estimated by the estimating unit 109.

Further, while it is explained that the breakage determining unit 117 determines breakage of a tool, the present invention is not limited to this example. It may be possible to determine a wide variety of abnormalities of a tool, such as deformation, defect, or breakage of the tool, or dropping of the tool from a jig.

As described above, by estimating a processing interval and performing comparison with a length of a normal processing interval (normal processing interval length), it becomes possible to determine whether a tool is broken or not. With this configuration, it becomes possible to notify a user of breakage of a tool and request the user to replace the tool, so that it is possible to shorten downtime of the processing machine 200, for example.

Second Modification

In a second modification, explanation will be given of operation of providing a prediction of breakage of a tool based on a change in feature information extracted from detection information. An overall configuration of a diagnosis system according to the second modification and hardware configurations of a diagnosis device (a diagnosis device 100b to be described later) and the processing machine 200 according to the second modification are the same as those of the embodiment described above.

FIG. 19 is a diagram illustrating an example of a functional block configuration of the diagnosis system according to the second modification. FIG. 20 is a diagram for explaining an example of a change in a frequency spectrum with deterioration of a tool. FIG. 21 is a diagram illustrating an example of a breakage prediction score. With reference to FIG. 19 to FIG. 21, the functional block configuration and the operation of a diagnosis system 1b according to the second modification will be described. The functional block configuration of the processing machine 200 is the same as that of the embodiment described above.

As illustrated in FIG. 19, the diagnosis device 100b of the diagnosis system 1b according to the second modification includes the communication control unit 101, the detection information receiving unit 102 (second acquiring unit), the processing information acquiring unit 103 (first acquiring unit), the accepting unit 104, the feature extracting unit 105 (extracting unit), the selecting unit 106, the calculating unit 107 (first calculating unit), the interval determining unit 108 (first determining unit), the estimating unit 109, the target interval specifying unit 110, the generating unit 111, the abnormality determining unit 112 (third determining unit), the storage unit 113, the input unit 114, the display control unit 115, the display unit 116, and a score calculating unit 118 (second calculating unit). Among the functional units included in the diagnosis device 100b, operation of the functional units other than the score calculating unit 118 is the same as the operation of the embodiment described above.

The score calculating unit 118 is a functional unit that calculates a score indicating a change in feature information, based on feature information in a processing interval that is estimated and obtained in advance for a tool in an unused state, and based on feature information corresponding to a processing interval that is subsequently estimated by the estimating unit 109.

Regarding the feature information (frequency spectrum) in the processing interval, if it is assumed that the feature information (frequency spectrum) illustrated in FIG. 6 described above corresponds to a tool in an unused state, the feature information changes with deterioration, such as abrasion, of the tool as illustrated in FIG. 20, for example. In general, if a tool, such as a drill, is deteriorated, friction between the tool and a processing target increases, so that amplitude of the same frequency component as that of the tool in the unused state may increase, or a frequency component that has not been present in a frequency spectrum of the tool in the unused state may appear. Therefore, it is expected that an integral value of frequency spectrums illustrated in FIG. 8 as described above (an area of frequency spectrums) is increased when a tool is deteriorated, as compared to when the tool is in the unused state.

Therefore, the score calculating unit 118 calculates, as a score indicating a change in the feature information (breakage prediction score), a value by integrating values (for example, integral values of the frequency spectrums) related to the feature information corresponding to the processing interval estimated by the estimating unit 109, generates a graph in which a score corresponding to a processing time is plotted as illustrated in FIG. 21, and causes the display control unit 115 to display the graph on the display unit 116, for example. With this configuration, a user of the processing machine 200 can recognize a foretaste of breakage of the tool when the breakage prediction score steeply increases as illustrated in FIG. 21, for example. The score calculating unit 118 is implemented by, for example, a program executed by the CPU 61 illustrated in FIG. 3. The score calculating unit 118 of the diagnosis device 100b illustrated in FIG. 19 may be implemented by causing the CPU 61 illustrated in FIG. 3 to execute a program, that is, by software, may be implemented by hardware, such as an IC, or may be implemented by a combination of software and hardware.

While it is explained that the score calculating unit 118 calculates, as the score, a value by integrating the values (for example, the integral values of the frequency spectrums) related to the feature information corresponding to the processing interval estimated by the estimating unit 109 and plots the calculated score, it may be possible to plot the values related to the feature information as they are.

As described above, it is possible to recognize a foretaste of breakage of a tool from a change in the value (for example, an integral value of the frequency spectrums) related to the feature information corresponding to the processing interval estimated by the estimating unit 109. In this case, it is configured to recognize a change in a value related to the feature information corresponding to only the processing interval, for which a noise component that is unrelated to the processing process and that is present in the non-processing interval as illustrated in FIG. 20 is eliminated by the estimating unit 109; therefore, it is possible to provide a prediction of breakage of a tool with high accuracy.

The program executed by the diagnosis system in the embodiment and the modifications as described above may be distributed by being incorporated in a ROM or the like in advance.

The program executed by the diagnosis system in the embodiment and the modifications as described above may be provided as a computer program product by being recorded in a computer readable recording medium, such as a compact disc ROM (CD-ROM), a flexible disk (FD), a compact disk recordable (CD-R), or a digital versatile disk (DVD) in a computer installable or a computer executable file format.

Furthermore, the program executed by the diagnosis system in the embodiment and the modifications as described above may be stored in a computer connected to a network, such as the Internet, and provided by download via the network. Moreover, the program executed by the diagnosis system in the embodiment and the modifications as described above may be provided or distributed via a network, such as the Internet.

Furthermore, the program executed by the diagnosis system in the embodiment and the modifications as described above has a module structure including the above-described functional units. As actual hardware, a CPU (a processor) reads and executes the program from the ROM, so that the above-described functional units are loaded on a main storage device and generated on the main storage device.

REFERENCE SIGNS LIST 1, 1a, 1b Diagnosis system
51 CPU
52 ROM
53 RAM
54 Communication I/F
55 Drive control circuit
56 Motor
57 Sensor
58 Sensor amplifier
59 Bus
61 CPU
62 ROM
63 RAM
64 Communication I/F
65 Sensor I/F
66 Auxiliary storage device
67 Input device
68 Display
69 Bus
100, 100a, 100b Diagnosis device
101 Communication control unit
102 Detection information receiving unit
103 Processing information acquiring unit
104 Accepting unit
105 Feature extracting unit
106 Selecting unit
107 Calculating unit
108 Interval determining unit
109 Estimating unit
110 Target interval specifying unit
111 Generating unit
112 Abnormality determining unit 113 Storage unit
114 Input unit
115 Display control unit
116 Display unit
117 Breakage determining unit
118 Score calculating unit
200 Processing machine
201 Numerical control unit
202 Communication control unit
203 Drive control unit
204 Driving unit
211 Detecting unit
401, 402 Selected part
701, 701-2 Context information
711a to 711c Detection information
721 Detection information
901 Context information
921 Detection information
1101 Context information
1111a to 1111c Detection information

CITATION LIST

Patent Literature

PTL 1: Japanese Patent No. 4860444

The invention claimed is:

1. A diagnosis device comprising:
a first acquiring unit configured to acquire, from a target device, a piece of context information corresponding to running operation of the target device among pieces of context information determined based on different kinds of operations of the target device;
a second acquiring unit configured to acquire detection information output from a detecting unit that detects a physical quantity that changes depending on operation of the target device;
an extracting unit configured to extract, from the detection information acquired by the second acquiring unit, feature information indicating a feature of a piece of detection information in an interval that includes a specific operation interval of the target device, the specific operation interval being indicated by the piece of context information;
a selecting unit configured to select a piece of reference feature information used as reference based on the feature information, and sequentially select pieces of target feature information to be compared with the piece of reference feature information;
a first calculating unit configured to calculate a likelihood of a process interval for a specific process of the target device based on a comparison between the piece of reference feature information and each of the pieces of target feature information selected by the selecting unit;
a first determining unit configured to determine whether a piece of target feature information corresponding to the likelihood of the process interval is included in the process interval for the specific process, based on the likelihood of the process interval; and
an estimating unit configured to estimate the process interval based on a determination result obtained by the first determining unit.

2. The diagnosis device according to claim 1, wherein the selecting unit selects, as the piece of reference feature information, a piece of feature information in an interval that is determined as a non-process interval being an interval other than the process interval based on the operation interval.

3. The diagnosis device according to claim 1, wherein the selecting unit selects, as a new piece of reference feature information, an average of a predetermined number of pieces of information that have been selected as pieces of the reference feature information in the past.

4. The diagnosis device according to claim 1, wherein the selecting unit selects, as the piece of reference feature information, a piece of information that is generated through machine learning performed on the feature information.

5. The diagnosis device according to claim 1, wherein
the extracting unit extracts, as the feature information, a frequency spectrum of the piece of detection information in the interval including the operation interval, and
the first calculating unit calculates the likelihood of the process interval based on a difference between a frequency spectrum serving as the piece of reference feature information and a frequency spectrum serving as each of the pieces of the target feature information.

6. The diagnosis device according to claim 1, wherein when the likelihood of the process interval is greater than a predetermined threshold, the first determining unit determines that the piece of target feature information corresponding to the likelihood of the process interval is included in the process interval for the specific process.

7. The diagnosis device according to claim 1, further comprising a second determining unit configured to determine presence or absence of an abnormality in a tool serving as the target device in the operation interval, as a result of a comparison between a length of the process interval estimated by the estimating unit and a length of a predetermined interval.

8. The diagnosis device according to claim 7, wherein the second determining unit determines that the abnormality has occurred in the tool when the length of the process interval estimated by the estimating unit is shorter than the length of the predetermined interval by a predetermined value or more.

9. The diagnosis device according to claim 7, wherein the predetermined interval is calculated based on a predetermined number of intervals that have been estimated as normal processing intervals in the past by the estimating unit.

10. The diagnosis device according to claim 7, wherein the predetermined interval is a process interval that was previously estimated by the estimating unit.

11. The diagnosis device according to claim 7, wherein the predetermined interval is the operation interval.

12. The diagnosis device according to claim 1, further comprising a second calculating unit configured to calculate a score indicating a change in the feature information corresponding to the process interval estimated by the estimating unit.

13. The diagnosis device according to claim 12, further comprising a display control unit configured to chronologically display the score calculated by the second calculating unit.

14. The diagnosis device according to claim 1, further comprising a third determining unit configured to determine whether operation performed by the target device is normal, by using a model that corresponds to the piece of context information acquired by the first acquiring unit among one or more models corresponding to one or more pieces of context information, and by using feature information that corresponds to the piece of context information and corresponds to the process interval estimated by the estimating unit.

15. The diagnosis device according to claim 14, further comprising a generating unit configured to generate a model from a piece of feature information corresponding to the process interval estimated by the estimating unit among whole feature information corresponding to the piece of context information acquired by the first acquiring unit.

16. A diagnosis system comprising:
the detecting unit, and
the diagnosis device according to claim 1.

17. A diagnosis method comprising:
acquiring, from a target device, a piece of context information corresponding to running operation of the target device among pieces of context information determined based on different kinds of operations of the target device;
acquiring detection information output from a detecting unit that detects a physical quantity that changes depending on operation of the target device;
extracting, from the detection information acquired at the acquiring, feature information indicating a feature of a piece of detection information in an interval that includes a specific operation interval of the target device, the specific operation interval being indicated by the piece of context information;
selecting a piece of reference feature information used as reference based on the feature information, and sequentially selects pieces of target feature information to be compared with the piece of reference feature information;
calculating a likelihood of a process interval for a specific process of the target device based on a comparison between the piece of reference feature information and each of the pieces of target feature information selected at the selecting;
determining whether a piece of target feature information corresponding to the likelihood of the process interval is included in the process interval for the specific process, based on the likelihood of the process interval; and
estimating the process interval based on a determination result obtained at the determining.

18. A non-transitory computer-readable medium including programmed instructions that cause a computer to execute:
acquiring, from a target device, a piece of context information corresponding to running operation of the target device among pieces of context information determined based on different kinds of operations of the target device;
acquiring detection information output from a detecting unit that detects a physical quantity that changes depending on operation of the target device;
extracting, from the detection information acquired at the acquiring, feature information indicating a feature of a piece of detection information in an interval that includes a specific operation interval of the target device, the specific operation interval being indicated by the piece of context information;
selecting a piece of reference feature information used as reference based on the feature information, and sequentially selects pieces of target feature information to be compared with the piece of reference feature information;
calculating a likelihood of a process interval for a specific process of the target device based on a comparison between the piece of reference feature information and each of the pieces of target feature information selected at the selecting;
determining whether a piece of target feature information corresponding to the likelihood of the process interval is included in the process interval for the specific process, based on the likelihood of the process interval; and
estimating the process interval based on a determination result obtained at the determining.

* * * * *